(12) United States Patent
Suzuki

(10) Patent No.: US 8,244,227 B2
(45) Date of Patent: Aug. 14, 2012

(54) INFORMATION PROVIDING DEVICE, MOBILE COMMUNICATION DEVICE, INFORMATION PROVIDING SYSTEM, INFORMATION PROVIDING METHOD, AND PROGRAM

(75) Inventor: Yohei Suzuki, Tokyo (JP)

(73) Assignee: Sony Corporation (JP)

( * ) Notice: Subject to any disclaimer, the term of this patent is extended or adjusted under 35 U.S.C. 154(b) by 290 days.

(21) Appl. No.: 12/657,519

(22) Filed: Jan. 22, 2010

(65) Prior Publication Data
US 2010/0190449 A1     Jul. 29, 2010

(30) Foreign Application Priority Data
Jan. 28, 2009   (JP) ................ P2009-017188

(51) Int. Cl.
*H04M 3/42* (2006.01)

(52) U.S. Cl. ............... 455/414.2; 455/404.2; 455/550.1; 342/457

(58) Field of Classification Search ............... 455/414.2, 455/404.2, 550.1, 456.1, 12.1; 342/457; 701/212
See application file for complete search history.

(56) References Cited

U.S. PATENT DOCUMENTS

| | | | | |
|---|---|---|---|---|
| 5,699,255 A * | 12/1997 | Ellis et al. | | 701/212 |
| 6,236,365 B1 * | 5/2001 | LeBlanc et al. | | 342/457 |
| 6,313,787 B1 * | 11/2001 | King et al. | | 342/357.42 |
| 6,404,388 B1 * | 6/2002 | Sollenberger et al. | | 342/387 |
| 6,590,533 B2 * | 7/2003 | Sollenberger et al. | | 342/387 |
| 6,847,801 B2 * | 1/2005 | de La Chapelle et al. | ... | 455/12.1 |
| 6,952,181 B2 * | 10/2005 | Karr et al. | | 342/457 |
| 6,972,717 B2 * | 12/2005 | Sollenberger et al. | | 342/387 |
| 8,060,582 B2 * | 11/2011 | Bliss et al. | | 709/218 |
| 2003/0054813 A1 * | 3/2003 | Riley et al. | | 455/424 |
| 2003/0222819 A1 * | 12/2003 | Karr et al. | | 342/457 |
| 2006/0084447 A1 * | 4/2006 | Sollenberger et al. | ..... | 455/456.2 |
| 2007/0033170 A1 * | 2/2007 | Sull et al. | | 707/3 |

(Continued)

FOREIGN PATENT DOCUMENTS

JP        2003249887 A       9/2003

(Continued)

OTHER PUBLICATIONS

Office Action from Japanese Application No. 2009-017188, dated Nov. 9, 2010.

*Primary Examiner* — Minh D Dao
(74) *Attorney, Agent, or Firm* — Lerner, David, Littenberg, Krumholz & Mentlik, LLP

(57) ABSTRACT

An information providing device includes: a measurement information receiver receiving, from one or more mobile communication devices, measurement information including position information representing a present position of one mobile communication device and speed information representing a speed of a communication at a given point of time; a measurement information storage unit storing the measurement information received from the one or more mobile communication devices; a specifying information receiver receiving position specifying information for specifying a predetermined position from the mobile communication device; a communication environment information extractor extracting as communication environment information one or more pieces of the measurement information including the speed information of communication speeds measured in the vicinity of the predetermined position from the measurement information stored in the measurement information storage unit; and a communication environment information transmitter transmitting the communication environment information to the mobile communication device having transmitted the position specifying information.

18 Claims, 17 Drawing Sheets

U.S. PATENT DOCUMENTS

| | | | |
|---|---|---|---|
| 2008/0146265 A1* | 6/2008 | Valavi | 455/550.1 |
| 2008/0280624 A1* | 11/2008 | Wrappe | 455/456.1 |
| 2009/0177379 A1* | 7/2009 | Jones | 701/207 |
| 2010/0100307 A1* | 4/2010 | Kim | 701/119 |
| 2010/0106801 A1* | 4/2010 | Bliss et al. | 709/219 |
| 2010/0121716 A1* | 5/2010 | Golan | 705/14.58 |
| 2011/0286437 A1* | 11/2011 | Austin et al. | 370/338 |

FOREIGN PATENT DOCUMENTS

| | | |
|---|---|---|
| JP | 2004312528 A | 11/2004 |
| JP | 2006-340388 A | 12/2006 |
| JP | 2007-124711 A | 5/2007 |
| JP | 2008011039 A | 1/2008 |
| WO | 2006059371 A1 | 6/2006 |
| WO | 2006095866 A1 | 9/2006 |

* cited by examiner

FIG. 6

POSITION INFORMATION

```
$GPGGA, 171501.9, 3537.545182, N, 13944.123242, E, 1, 08,
$GPGGA, 171502.9, 3537.545335, N, 13944.124219, E, 1, 08,
$GPGG, FIRST TIME INFORMATION,  POSITION INFORMATION  1, 08,
$GPGGA, 171504.9 , 3537.545277, N, 13944.125683, E , 1, 08,
$GPGGA, 171505.9, 3537.545245, N, 13944.126741, E, 1, 08,
...
```

SPEED INFORMATION

```
08/04/2008,  17:15:04 ,              0.354  Mbps
08/04/2008, SECOND TIME INFORMATION SPEED INFORMATION
08/04/2008,  17:15:24,               0.367 Mbps
08/04/2008,  17:15:34,               0.350 Mbps
...
```

MEASUREMENT INFORMATION

```
08/06/2008, 17:14:43, 35.37544786, 139.44122133, 0.342
08/06/2008, 17:14:53, 35.37544305, 139.44126686, 0.335
08/06/2008, 17:15:04 , 35.37545277 , 139.44125683 , 0.354
08/06/2008, 17:15:14, 35.37543161, 139.44126416, 0.335
08/06/2008, 17:15:24, 35.37544241, 139.44122845, 0.367
08/06/2008, 17:15:34, 35.37545301, 139.44122531, 0.350
08/06/2008, 17:15:44, 35.37549255, 139.44128008, 0.354
```

INFORMATION PROVIDING DEVICE, MOBILE COMMUNICATION DEVICE, INFORMATION PROVIDING SYSTEM, INFORMATION PROVIDING METHOD, AND PROGRAM

CROSS-REFERENCE TO RELATED APPLICATION

The present application claims priority from Japanese Patent Application No. JP 2009-017188 filed in the Japanese Patent Office on Jan. 28, 2009, the entire content of which is incorporated herein by reference.

BACKGROUND OF THE INVENTION

1. Field of the Invention

The present invention relates to an information providing device, a mobile communication device, an information providing system, an information providing method, and a program.

2. Description of the Related Art

Speeds of communications established between mobile terminals and a base station vary depending on communication conditions such as the surroundings of the mobile terminals and the communication times. Accordingly, users of the mobile terminals are often forced to search for the communication environments from which a desired communication speed can be obtained. In this case, the users may not check the goodness or badness of the communication environments, thereby causing difficulty in searching for the communication environments.

Japanese Unexamined Patent Application Publication No. 2007-124711 discloses a system for plotting a communication speed predicted from the number of terminals connected to a base station on map information and providing the plotted map information to the user of the mobile terminal. Accordingly, the user can search for a good communication environment on the basis of the predicted value of the communication speed plotted on the map information.

Japanese Unexamined Patent Application Publication No. 2006-340388 discloses a system for storing a communication speed confirmed at a specific position in correlation with position information in advance and providing the position information on the specific position at which the desired communication speed can be obtained to a user of a mobile terminal. Accordingly, the user can search for a good communication environment on the basis of the position information on the specific position.

SUMMARY OF THE INVENTION

However, in the system described in Japanese Unexamined Patent Application Publication No. 2007-124711, since the communication speed is predicted from the number of terminals connected to the base station, only the maximum communication speed which can be theoretically obtained between the base station and the mobile terminal is provided. In the system described in Japanese Unexamined Patent Application Publication No. 2006-340388, since the confirmed communication speeds at the specific positions are stored in advance, only the confirmed communication speed between the base station and the mobile terminal is provided. Therefore, the user will find difficult searching for a good communication environment on the basis of the actual communication speed varying depending on the communication condition.

It is desirable to provide an information providing device, a mobile communication device, an information providing system, an information providing method, and a program which enables the search for a good communication environment based on an actual communication speed.

According to an embodiment of the invention, there is provided an information providing device including: a measurement information receiver receiving, from one or more mobile communication devices, measurement information including position information representing a present position of one mobile communication device and speed information representing a speed of a communication performed between the mobile communication device and a wireless base station at a given point of time; a measurement information storage unit storing the measurement information received from the one or more mobile communication devices; a specifying information receiver receiving position specifying information for specifying a predetermined position from the mobile communication device; a communication environment information extractor extracting as communication environment information one or more pieces of the measurement information including the speed information of communication speeds measured in the vicinity of the predetermined position from the measurement information stored in the measurement information storage unit; and a communication environment information transmitter transmitting the communication environment information to the mobile communication device having transmitted the position specifying information.

According to this configuration, the information providing device receives, from one or more mobile communication devices, measurement information including position information representing a present position of one mobile communication device and speed information representing a speed of a communication performed between the mobile communication device and a wireless base station at a given point of time. The information providing device stores the measurement information received from the one or more mobile communication devices and receives position specifying information for specifying a predetermined position from the mobile communication device. The information providing device extracts as communication environment information one or more pieces of the measurement information including the speed information of communication speeds measured in the vicinity of the predetermined position from the measurement information stored in the measurement information storage unit, and transmits the communication environment information to the mobile communication device having transmitted the position specifying information. Accordingly, the information providing device can provide a user of a mobile communication device with the communication environment information based on the actual communication speed, which is measured by one or more mobile communication devices and varies depending on the communication conditions.

The information providing device may further include a communication environment map information preparing unit preparing communication environment map information in which the speed information of the communication speeds measured in the vicinity of the predetermined position is plotted on map information on the basis of the communication environment information. Here, the communication environment information transmitter may transmit the communication environment map information to the mobile communication device having transmitted the position specifying information. Accordingly, by providing a user of a mobile communication device with the communication environment information as the communication environment map information, it is possible to facilitate the user's search for a good communication environment based on the actual communication speed.

The measurement information receiver may receive, from the one or more mobile communication devices, the measurement information including the position information, the speed information, and communication condition information representing a communication condition affecting the speed of the communication performed between the mobile communication device and the wireless base station at a given point of time. The communication environment information extractor may extract, as the communication environment information, one or more pieces of the measurement information corresponding to a predetermined communication condition out of the one or more pieces of the measurement information, which includes the speed information of the communication speeds measured in the vicinity of the predetermined position, from the measurement information stored in the measurement information storage unit. The communication environment information transmitter may transmit the communication environment information to the mobile communication device having transmitted the position specifying information. Accordingly, by transmitting the measurement information corresponding to a predetermined communication condition as the communication environment, it is possible to improve the accuracy of the communication environment information provided to the user of the mobile communication device.

The information providing device may further include a communication environment map information preparing unit preparing communication environment map information in which the speed information included in the one or more pieces of measurement information corresponding to the predetermined communication condition out of the speed information of the communication speeds measured in the vicinity of the predetermined position is plotted on map information on the basis of the communication environment information. Here, the communication environment information transmitter may transmit the communication environment map information to the mobile communication device having transmitted the position specifying information. Accordingly, by providing a user of a mobile communication device with the measurement information corresponding to a predetermined communication condition as the communication environment map information, it is possible to facilitate the user's search for a good communication environment based on the actual communication speed.

According to another embodiment of the invention, there is provided a mobile communication device including: a position information acquiring unit acquiring position information representing a present position of the mobile communication device; a speed information acquiring unit measuring a speed of a communication performed between a wireless base station and the mobile communication device and acquiring the measured communication speed as speed information; a measurement information transmitter transmitting measurement information including the position information and the speed information at a given point of time to an information providing device; a specifying information transmitter transmitting position specifying information for specifying a predetermined position to the information providing device; a communication environment information receiver receiving, as communication environment information from the information providing device, one or more pieces of the measurement information including the speed information on the communication speeds measured in the vicinity of the predetermined position out of the measurement information, which is transmitted from one or more mobile communication devices and stored in the information providing device; and an output unit outputting the communication environment information.

According to this configuration, the mobile communication device acquires position information representing a present position of the mobile communication device, measures a speed of a communication performed between a wireless base station and the mobile communication device to acquire the measured communication speed as speed information, and transmits measurement information including the position information and the speed information at a given point of time to an information providing device. The mobile communication device transmits position specifying information for specifying a predetermined position to the information providing device. The mobile communication device receives, as communication environment information from the information providing device, one or more pieces of the measurement information including the speed information on the communication speeds measured in the vicinity of the predetermined position out of the measurement information, which is transmitted from one or more mobile communication devices and stored in the information providing device, and outputs the communication environment information. Accordingly, a user of the mobile communication device can search for a good communication environment on the basis of the actual communication speed, which is measured by one or more mobile communication devices and varies depending on the communication conditions, by confirming the communication environment information.

The communication environment information receiver may receive communication environment map information in which the speed information of the communication speeds measured in the vicinity of the predetermined position is plotted on map information from the information providing device, and the output unit may output the communication environment map information. Accordingly, by outputting the communication environment information as the communication environment map information, a user can easily search for a good communication environment based on the actual communication speed.

The mobile communication device may further include a communication condition information acquiring unit acquiring communication condition information representing a communication condition affecting the speed of the communication performed between the wireless base station and the mobile communication device. Here, the measurement information transmitter may transmit the measurement information including the position information, the speed information, and the communication condition information at a given point of time to the information providing device. The communication environment information receiver may receive, as the communication environment information from the information providing device, one or more pieces of the measurement information corresponding to the predetermined communication condition out of the one or more pieces of the measurement information including the speed information of the communication speeds measured in the vicinity of the predetermined position. The output unit may output the communication environment information. Accordingly, by outputting the measurement information corresponding to a predetermined communication condition as the communication environment information, it is possible to improve the accuracy of the communication environment information.

The communication environment information receiver may receive, from the information providing device, communication environment map information in which the speed information included in the one or more pieces of the measurement information corresponding to the predetermined communication condition out of the speed information of the communication speeds measured in the vicinity of the predetermined position is plotted on map information. Here, the output unit may output the communication environment map information. Accordingly, by outputting the measurement information corresponding to a predetermined communication condition as the communication environment map information, a user can easily search for a good communication environment based on the actual communication speed.

The mobile communication device may further include a search unit searching the measurement information included in the communication environment information or the communication environment map information for the measurement information corresponding to a predetermined search condition. Here, the output unit may output the speed information included in the searched measurement information. Accordingly, by outputting the speed information included in the measurement information corresponding to a predetermined search condition, a user can easily search for a good communication environment based on the actual communication speed.

According to another embodiment of the invention, there is provided an information providing system including the information providing device and one or more mobile communication devices according to the above-mentioned embodiments.

According to another embodiment of the invention, there is provided an information providing method including the steps of: receiving, from one or more mobile communication devices, measurement information including position information representing a present position of one mobile communication device and speed information representing a speed of, a communication performed between the mobile communication device and a wireless base station at a given point of time; storing the measurement information received from the one or more mobile communication devices; receiving position specifying information for specifying a predetermined position from the mobile communication device; extracting as communication environment information one or more pieces of the measurement information including the speed information of communication speeds measured in the vicinity of the predetermined position from the stored measurement information; and transmitting the communication environment information to the mobile communication device having transmitted the position specifying information.

Accordingly, it is possible to provide a user of a mobile communication device with communication environment information based on an actual communication speed, which is measured by one or more mobile communication devices and varies depending on the communication conditions.

According to another embodiment of the invention, there is provided a program causing a computer to execute the information providing method according to the above-mentioned embodiment of the invention.

According to the embodiments of the invention, it is possible to provide an information providing device, a mobile communication device, an information providing system, an information providing method, and a program which enables the search for a good communication environment based on an actual communication speed.

BRIEF DESCRIPTION OF THE DRAWINGS

FIG. 6 is a diagram illustrating a method of preparing measurement information.

DESCRIPTION OF THE PREFERRED EMBODIMENTS

Figure 1:
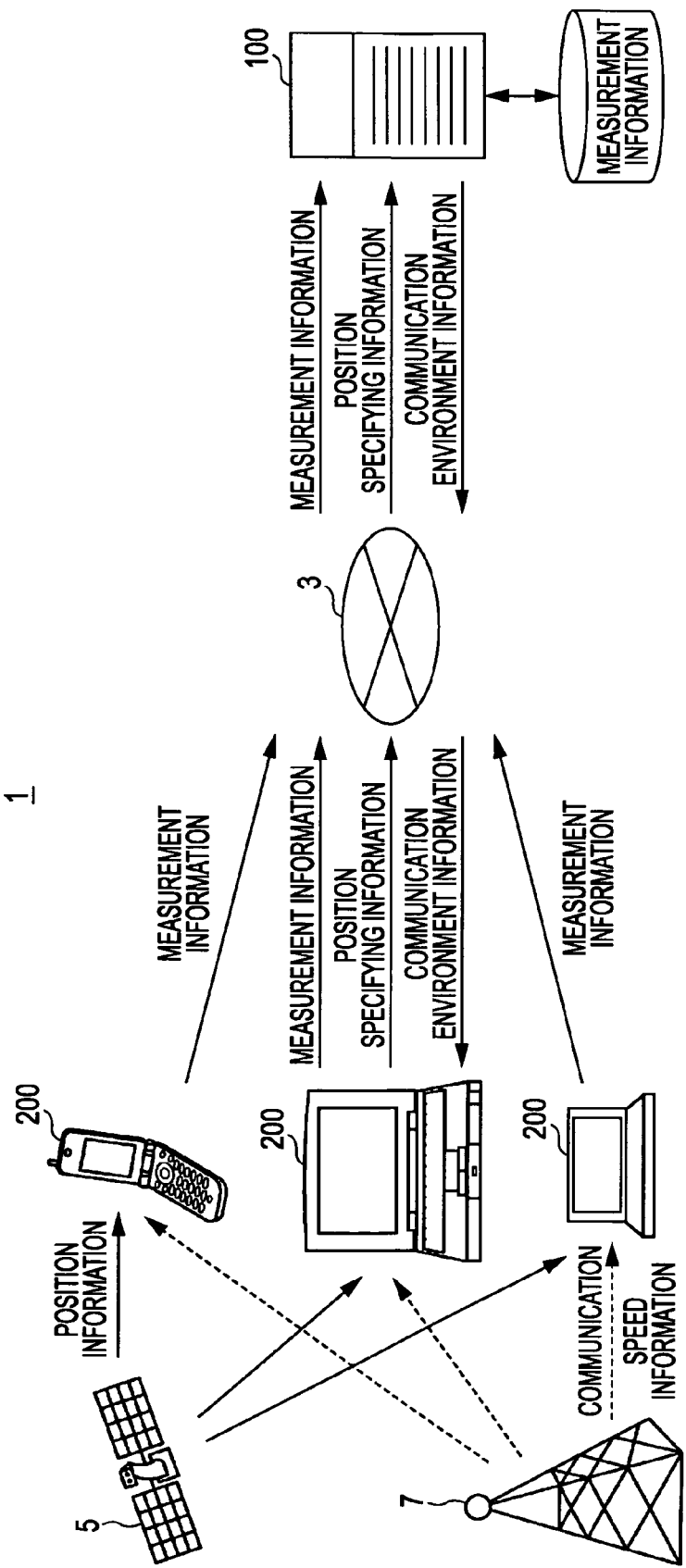
FIG. 1 is a diagram illustrating the outline of an information providing system according to an embodiment of the invention.

Hereinafter, preferred embodiments of the invention will be described in detail with reference to the accompanying drawings. In this specification and the accompanying drawings, elements having substantially like functional configurations are referenced by like reference numerals and descriptions thereof are not repeated.

The embodiments of the invention will be described in the following order.

1. Outline of Information Providing System
2. First Embodiment
2-1. Functional Configuration of Information Providing Server
2-2. Functional Configuration of Mobile Terminal
2-3. Information Providing Method
2-3-1. Acquisition of Measurement Information
2-3-2. Display of Communication Environment Map Information 2-3-3. Search for Measurement Information
2-4. Conclusion
3. Second Embodiment
3-1. Functional Configuration of Information Providing Server
3-2. Functional Configuration of Mobile Terminal
3-3. Information Providing Method
3-3-1. Communication Condition of Base Station
3-3-2. External Communication Condition
3-3-3. Communication Condition of Terminal
3-4. Conclusion
4. Hardware Configuration 1. Outline of Information Providing System The outline of an information providing system 1 according to an embodiment of the invention will be described now with reference to FIG. 1. FIG. 1 is a diagram illustrating the outline of the information providing system 1 according to the embodiment of the invention.

As shown in FIG. 1, the information providing system includes an information providing server 100 (information providing device) and one or more mobile terminals 200 (mobile communication device) capable of accessing the information providing server 100 through a wireless communication network. The mobile terminal 200 communicates with another mobile terminal 200 through a communication network 3 such as a wireless LAN and a wireless WAN.

The mobile terminal 200 may be a personal computer or may be a mobile communication device having a wireless communication function, such as a mobile phone, a PDA (Personal Digital Assistant), a portable game machine, a portable video and audio player.

The mobile terminal 200 acquires position information representing a present position of the mobile terminal using a positioning system such as a GPS (Global Positioning System) employing a communication satellite 5. The mobile terminal 200 measures a speed of a communication performed between a base station 7 and the mobile terminal using a throughput measuring function and acquires the measured communication speed as speed information. The mobile terminal 200 prepares measurement information including the position information and the speed information at a given point of time and transmits the prepared measurement information to the information providing server 100. The information providing server 100 receives the measurement information from one or more mobile terminals 200 and stores the received measurement information in a database.

The mobile terminal 200 transmits position specifying information for specifying a predetermined position to the information providing server 100. When receiving the position specifying information, the information providing server 100 extracts one or more pieces of measurement information including speed information of the communication speeds measured in the vicinity of the predetermined position as communication environment information from the measurement information stored in the database and transmits the communication environment information to the mobile terminal 200 having transmitted the position specifying information. The mobile terminal 200 receives and outputs the communication environment information. A user of the mobile terminal 200 can search for a good communication environment on the basis of the actual communication speed measured by one or more mobile terminals 200 and varying depending on the communication conditions by confirming the communication environment information.

First Embodiment

Figure 2:
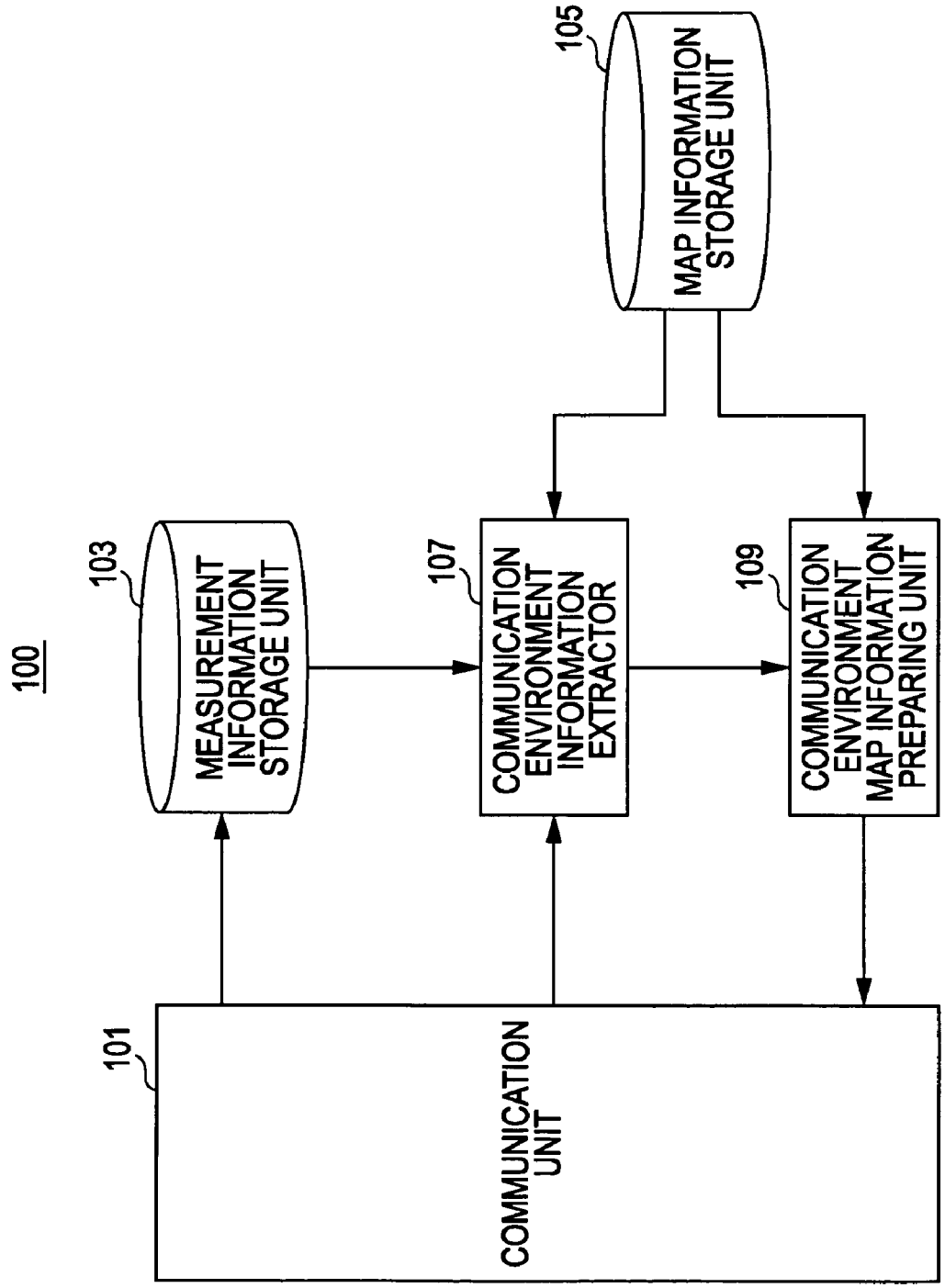
FIG. 2 is a block diagram illustrating the main functional configuration of an information providing server according to a first embodiment of the invention.

A first embodiment of the invention will be described now with reference to FIGS. 2 to 10D.
2-1. Functional Configuration of Information Providing Server The information providing server 100 according to the first embodiment of the invention will be described with reference to FIG. 2. FIG. 2 is a block diagram illustrating the main functional configuration of the information providing server 100 according to the first embodiment.

As shown in FIG. 2, the information providing server 100 includes a communication unit 101, a measurement information storage unit 103, a map information storage unit 105, a communication environment information extractor 107, and a communication environment map information preparing unit 109.

The communication unit 101 transmits and receives a variety of information to and from the mobile terminals 200 through the wireless communication network 3. The communication unit 101 receives the measurement information and the position specifying information from the mobile terminals 200 and transmits the communication environment information and the communication environment map information to the mobile terminals 200. The communication unit 101 may transmit and receive a variety of information to and from another system (such as a map information providing system) through the wireless communication network 3. The communication unit 101 serves as the measurement information receiver, the specifying information receiver, and the communication environment information transmitter.

The measurement information storage unit 103 includes a database or the like and stores the measurement information received from one or more mobile terminals 200. The measurement information storage unit 103 stores the measurement information along with time information given from the mobile terminals 200 or the information providing server 100.

The map information storage unit 105 stores map information including coordinate information such as latitudes and longitudes and spot information such as addresses, place names, and establishment names. The map information storage unit 105 may store map relevant information related to the map information, such as usage information of establishments. The map information storage unit 105 stores the coordinate information, the spot information, and the map relevant information in correlation with each other. At least a part of the function of the map information storage unit 105 may be constructed by a map information providing system.

The communication environment information extractor 107 extracts one or more pieces of measurement information including the speed information of the communication speeds measured in the vicinity of a predetermined position, as the communication environment information, from the measurement information storage unit 103 on the basis of the position specifying information received from the mobile terminal 200.

The communication environment map information preparing unit 109 prepares communication environment map information in which the speed information of the communication speeds measured in the vicinity of a predetermined position is plotted on the map information on the basis of the communication environment information extracted by the communication environment information extractor 107.

The elements of the information providing server 100 may be constructed by general-purpose members or circuits or may be constructed by hardware specialized for the functions of the elements. Some functions of the elements may be embodied by programs executed by a CPU.

2-2. Functional Configuration of Mobile Terminal

Figure 3:
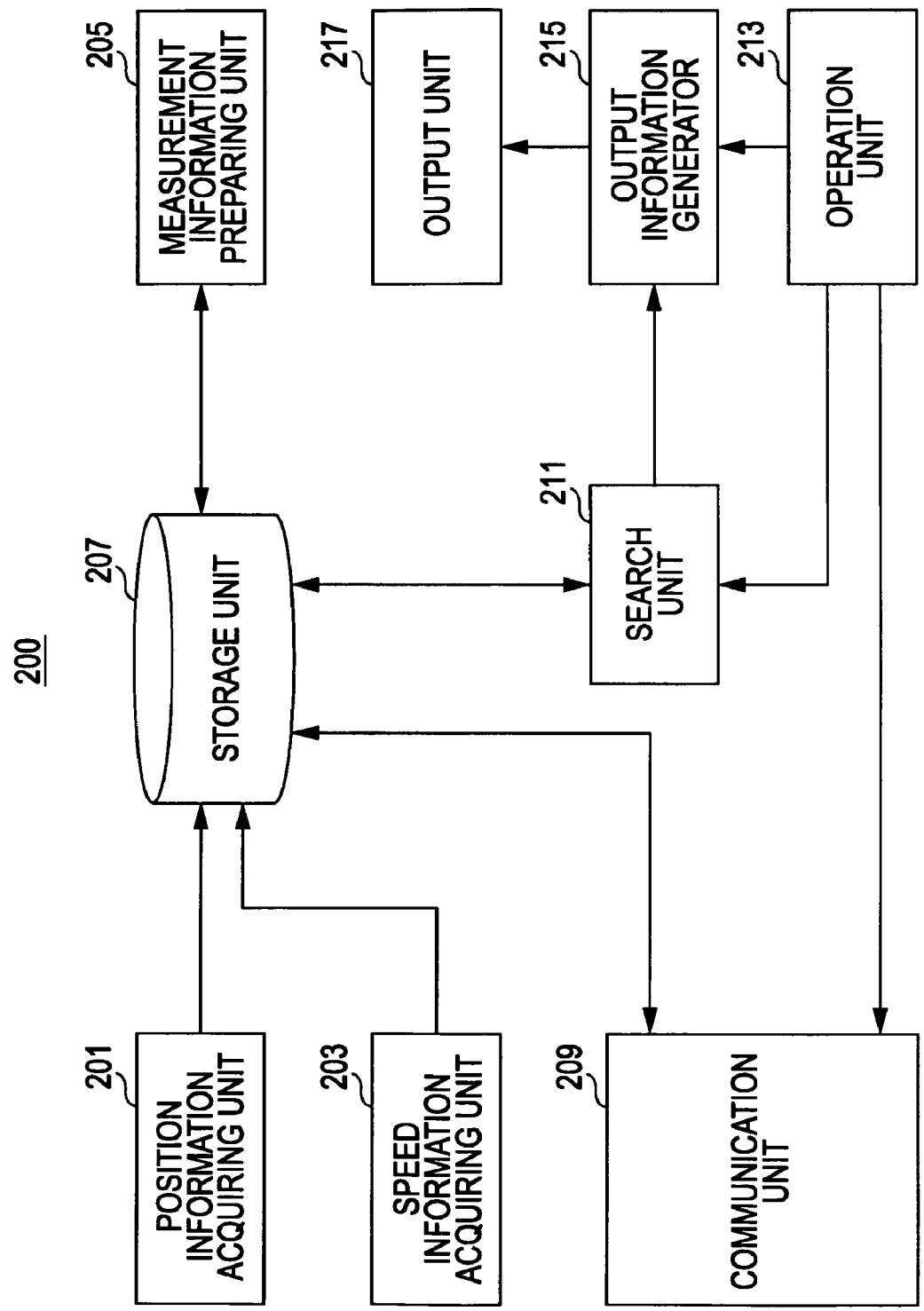
FIG. 3 is a block diagram illustrating the main functional configuration of a mobile terminal according to the first embodiment of the invention.

The mobile terminal 200 according to the first embodiment of the invention will be described with reference to FIG. 3. FIG. 3 is a block diagram illustrating the main functional configuration of the mobile terminal 200 according to the first embodiment.

As shown in FIG. 3, the mobile terminal 200 includes a position information acquiring unit 201, a speed information acquiring unit 203, a measurement information preparing unit 205, a storage unit 207, a communication unit 209, a search unit 211, an operation unit 213, an output information generator 215, and an output unit 217.

The position information acquiring unit 201 acquires the position information representing the present position (the latitude and the longitude) of the mobile terminal using the positioning system such as the GPS. The position information acquiring unit 201 stores the position information in the storage unit 207 along with first time information representing the acquiring time of the position information. The position information may be acquired using a scheme of estimating the present position on the basis of RF information of the wireless LAN, not limited to the positioning system.

The speed information acquiring unit 203 measures the speed of the communication performed between the base station 7 and the mobile terminal and acquires the measured communication speed as the communication speed information. The speed information acquiring unit 203 stores the speed information in the storage unit 207 along with second time information representing the acquiring time of the speed information.

The measurement information preparing unit 205 prepares the measurement information including the position information and the speed information at a given point of time. The measurement information preparing unit 205 prepares the measurement information at the given point of time by synchronizing the position information with the speed information on the basis of the first and second time information and stores the prepared measurement information in the storage unit 207. The measurement information preparing unit 205 may store the measurement information in the storage unit 207 along with the time information representing the given point of time.

The storage unit 207 stores the position information, the speed information, the measurement information, the communication environment information, the communication environment map information, image data of search menu, and movement history information.

The communication unit 209 transmits and receives a variety of information between the base station 7 and the information providing server 100 through the wireless communication network 3. The communication unit 209 transmits the measurement information and the position specifying information to be described later to the information providing server 100 and receives the communication environment information and the communication environment map information from the information providing server 100. The communication unit 209 may transmit and receive a variety of information to and from a system (such as the map information providing system) other than the information providing server 100 through the wireless communication network 3. The communication unit 209 serves as the measurement information transmitter, the specifying information transmitter, and the communication environment information receiver.

The search unit 211 searches the measurement information included in the communication environment information and/or the communication environment map information for the measurement information satisfying a predetermined search condition. It is preferable that the search unit 211 has a function of sorting the searched measurement information on the basis of a predetermined sorting condition. The predetermined search condition and/or sorting condition may be specified by a user or may be specified by the mobile terminal 200.

The operation unit 213 allows a user to input a variety of information such as the position specifying information for specifying a predetermined position and operating operation of the search menu. The output information generator 215 generates output information such as the communication environment information, the communication environment map information, and the search menu to be output from the output unit 217. Here, the communication environment information is information representing communication environments in the vicinity of the predetermined position specified by the position specifying information and the communication environment map information is map information representing the communication environments. The output unit 217 outputs the communication environment information, the communication environment map information, the search menu, and the speed information as character image information and/or audio information.

The elements of the mobile terminal 200 may be constructed by general-purpose members or circuits or may be constructed by hardware specialized for the functions of the elements. Some functions of the elements may be embodied by programs executed by a CPU.

2-3. Information Providing Method

Figure 4:
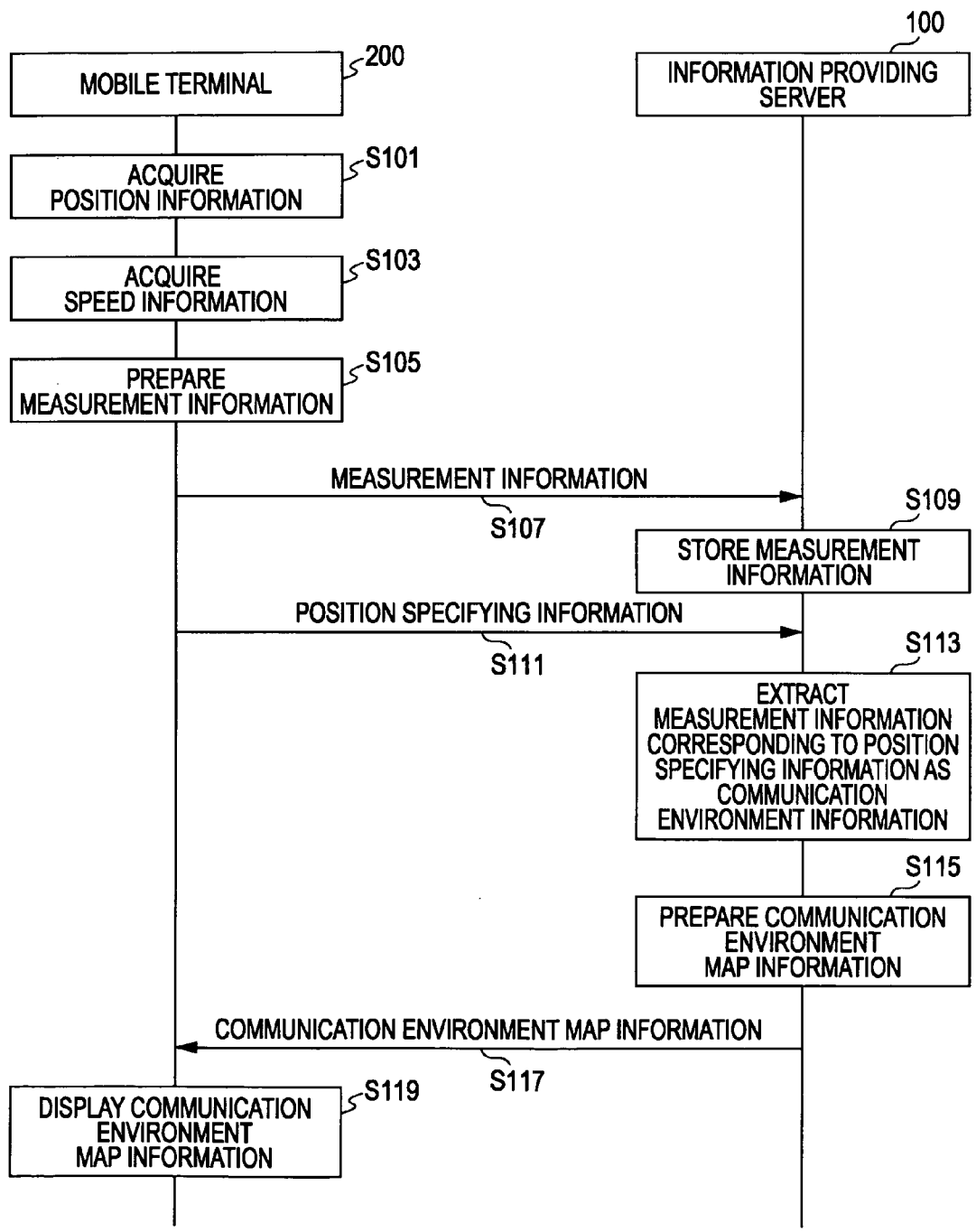
FIG. 4 is a sequence diagram illustrating a flow of an information providing method according to the first embodiment of the invention.

An information providing method according to the first embodiment of the invention will be described with reference to FIG. 4. FIG. 4 is a diagram illustrating the flow of the information providing method according to the first embodiment.

2-3-1. Acquisition of Measurement Information

The measurement information acquiring unit 201 acquires the position information representing the present position of the mobile terminal 200 (S101). The position information acquiring unit 201 receives positioning data from the positioning system and acquires the position information included in the positioning data. The position information acquiring unit 201 stores the acquired position information in the storage unit 207 along with the first time information representing the acquiring time of the position information (positioning data). The position information acquiring unit 201 may acquire the position information at the time of communicating with the base station 7 or may periodically acquire the position information, for example, every several minutes.

The position information acquiring unit 201 may store the acquired position information in the storage unit 207 as the movement history information representing the movement history of the user of the mobile terminal 200. Accordingly, the user can confirm his or her movement history by causing the mobile terminal 200 to display the movement history information on the map information. The user can prepare desired information (such as blog information and image information) in conjunction with the map information using the movement history information.

Selectively, the position information acquiring unit 201 may confirm the reliability of the position information on the basis of a reliability indicator included in the positioning data. When some positioning systems can enable the positioning using the RF waves from plural communication satellites 5, the three-dimensional positioning is performed and the reliability indicator representing that the three-dimensional position is performed is included in the positioning data. Accordingly, the position information acquiring unit 201 stores the position information included in the positioning data when the reliability indicator is included in the positioning data, and may not store the position information when the reliability indicator is not included therein.

Figure 5:
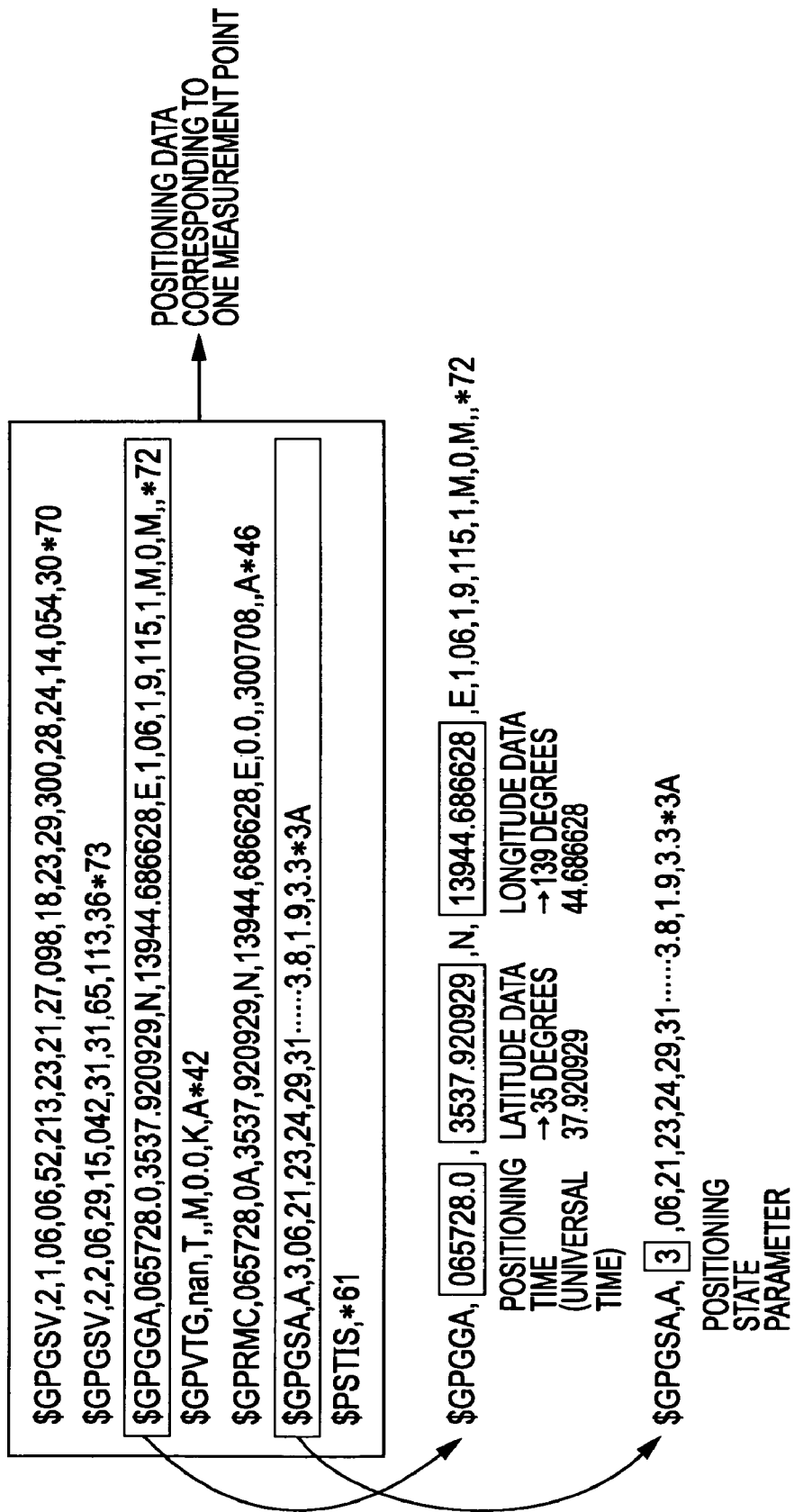
FIG. 5 is a diagram illustrating an example of positioning data acquired from a positioning system.

FIG. 5 is a diagram illustrating an example of the positioning data acquired from the positioning system. As shown in FIG. 5, the positioning data includes a positioning time (world time), latitude and longitude data, and a positioning status parameter. The latitude and longitude data is acquired as the position information. The positioning status parameter expresses positioning disable "1", two-dimensional positioning "2", and three-dimensional positioning "3".

The speed information acquiring unit 203 measures the speed of a communication performed between the base station 7 and the mobile terminal and acquires the measured communication speed as the speed information (S103). The speed information acquiring unit 203 stores the acquired speed information in the storage unit 207 along with the second time information representing the acquiring (speed measuring) time of the speed information. The speed information acquiring unit 203 may measure the communication speed at a predetermined time such as a communication start time and a communication end time during the communication with the base station 7 or may periodically measure the communication speed, for example, every several seconds.

The measurement information preparing unit 205 prepares the measurement information including the position information and the speed information at a given point of time (S105). The measurement information preparing unit 205 prepares the measurement information at a given point of time by synchronizing the position information with the speed information on the basis of the first and second time information and stores the prepared measurement information in the storage unit 207. The measurement information preparing unit 205 may store the measurement information along with the time information representing the given point of time. The measurement information preparing unit 205 may try to prepare the measurement information whenever the speed information is stored, or may periodically try to prepare the measurement information, for example, every several minutes.

The measurement information preparing unit 205 prepares the measurement information when the position information and the speed information usable to prepare the measurement information are stored at the point of time of trying to prepare the measurement information. The position information and the speed information usable to prepare the measurement information and the position information and the speed information unusable to prepare the measurement information may be deleted from the storage unit 207. Here, the measurement information preparing unit 205 determines that the position information and the speed information capable of being synchronized with each other for the measurement information at a given point of time is usable to prepare the measurement information on the basis of the first and second time information.

FIG. 6 is a diagram illustrating a method of preparing the measurement information. As shown in FIG. 6, the storage unit 207 stores the position information (the latitude and longitude data) in correlation with the first time information. In addition, the storage unit 207 stores the speed information in correlation with the second time information. The measurement information is prepared by synchronizing the position information and the speed information at a given point of time on the basis of the first and second time information and is stored in the storage unit 207 in correlation with the time information representing the given point of time. Here, the time information correlated with the measurement information is substantially the same as the first and second time information.

The communication unit 209 transmits the measurement information to the information providing server 100 (S107). The communication unit 209 may transmit the measurement information to the information providing server 100 whenever the measurement information is prepared, or may periodically transmit the measurement information to the information providing server 100, for example, every several tens minutes. In the former, the measurement information may be transmitted without being stored in the storage unit 207.

When the communication unit 101 receives the measurement information from one or more mobile terminals 200, the measurement information storage unit 103 stores the measurement information received from the mobile terminal 200 (S109). The measurement information storage unit 103 may store the measurement information along with the time information representing the given point of time given from the mobile terminal 200 or may store the measurement information along with the time information representing the storing time given from the information providing server 100. Here, to maintain the reliability of the measurement information, it is preferable that the available period of the measurement information is determined in advance and the measurement information of which the available period expires is deleted from the measurement information storage unit 103.

The information providing server 100 may analyze the measurement information stored in the measurement information storage unit 103 and may provide communication NG information representing the spot to a communication provider when the communication environment of the spot is usually not good (the communication speed is usually low). Accordingly, the communication provider can use the communication NG information to improve the communication quality.

The information providing server 100 may provide an advantage to the user of the mobile terminal 200 having transmitted the measurement information. The information providing server 100 may provide, for example, a coupon ticket usable in a shop to the user of the mobile terminal 200 having transmitted the speed information acquired in the vicinity of the shop. Here, the information providing server 100 can specify the acquiring spot of the speed information on the basis of the position information included in the measurement information and can specify shops around the acquiring spot of the speed information on the basis of the map relevant information. The information providing server 100 can specify the user of the mobile terminal 200 on the basis of the registration information registered in advance. Accordingly, the information providing server 100 can acquire the measurement information from many mobile terminals 200, thereby improving the accuracy of the communication environment information.

2-3-2. Display of Communication Environment Map Information

The communication unit 209 transmits the position specifying information for specifying a predetermined position to the information providing server 100 (S111). The predetermined position may be specified as the present position of the mobile terminal 200 acquired by the position information acquiring unit 201 or may be specified as a position specified by the user. In the former, the predetermined position is specified by the latitudes and the longitudes. In the latter, the predetermined position may be specified by the latitudes and the longitudes, or may be specified by the spot information such as addresses, place names, and establishment names.

The communication unit 209 may transmit the position specifying information by the user's operation or depending on the determination of the mobile terminal 200. In the former, for example, when the user input predetermined operation information using the operation unit 213, the position specifying information for specifying the present position of the mobile terminal 200 or the position specifying information specifying a position specified by the user is transmitted. In the latter, for example, when the communication speed acquired by the speed information acquiring unit 203 is less than a predetermined value, the position information representing the present position of the mobile terminal 200 is transmitted as the position specifying information.

When the communication unit 101 receives the position specifying information from the mobile terminal 200, the communication environment information extractor 107 extracts the communication environment information on the basis of the position specifying information received from the mobile terminal 200 (S113). The communication environment information extractor 107 extracts as the communication environment information one or more pieces of the measurement information including the speed information of the communication speeds measured in the vicinity of a predetermined position specified by the position specifying information. When the predetermined position is specified by the spot information, the communication environment information extractor 107 extracts the communication environment information on the basis of the latitude and the longitude of the predetermined position converted from the spot information using the map information stored in the map information storage unit 105.

The communication environment information extractor 107 specifies the peripheral region of the predetermined position on the basis of the position specifying information received from the mobile terminal 200. Here, the peripheral region is specified, for example, by the position information (latitudes and longitudes) representing a 1 km-square region centered on the predetermined position or a region with a radius of 0.5 km. The communication environment information extractor 107 extracts as the communication environment information the measurement information including the speed information of the communication speed measured in the peripheral region from the measurement information stored in the measurement information storage unit 103.

The communication environment map information preparing unit 109 prepares communication environment map information in which the speed information of the communication speeds measured in the vicinity of the predetermined position is plotted on the map information on the basis of the communication environment information (S115).

The communication environment map information preparing unit 109 extracts the map information representing the range of the peripheral region from the map information stored in the map information storage unit 105. The communication environment map information preparing unit 109 plots the speed information of the measurement information is plotted at the positions, indicated by the position information of the measurement information included in the communication environment information, in the extracted map information on the basis of the communication environment information. Here, the speed information is plotted, for example, different color markers or different shape markers depending on the communication speed indicated by the speed information. The communication unit 101 transmits the communication environment information to the mobile terminal 200 having transmitted the position specifying information (S117).

When the communication unit 209 receives the communication environment map information from the information providing server 100, the output information generator 215 generates the output information on the basis of the communication environment map information and the output unit 217 plots the speed information of the communication speeds measured in the vicinity of the predetermined position on the map information and displays the resultant as character image information (S119).

The information providing server 100 may transmit the communication environment information to the mobile terminal 200 along with the communication environment map information or may transmit the communication environment information instead of the communication environment map information to the mobile terminal 200. In this case, when the communication unit 209 receives the communication environment information from the information providing server 100, the output information generator 215 generates the output information on the basis of the communication environment information and the output unit 217 outputs the measurement information including the speed information of the communication speeds measured in the vicinity of the predetermined position as character image information and/or audio information.

The output unit 217 may display the speed information acquired by the speed information acquiring unit 203 and may update the display of the speed information whenever the speed information is acquired, regardless of the display of the communication environment information or the communication environment map information. Accordingly, the user can determine whether a good communication environment can be searched for using the communication environment information or the communication environment map information by referring to the speed information to be displayed or updated.

Figure 7:
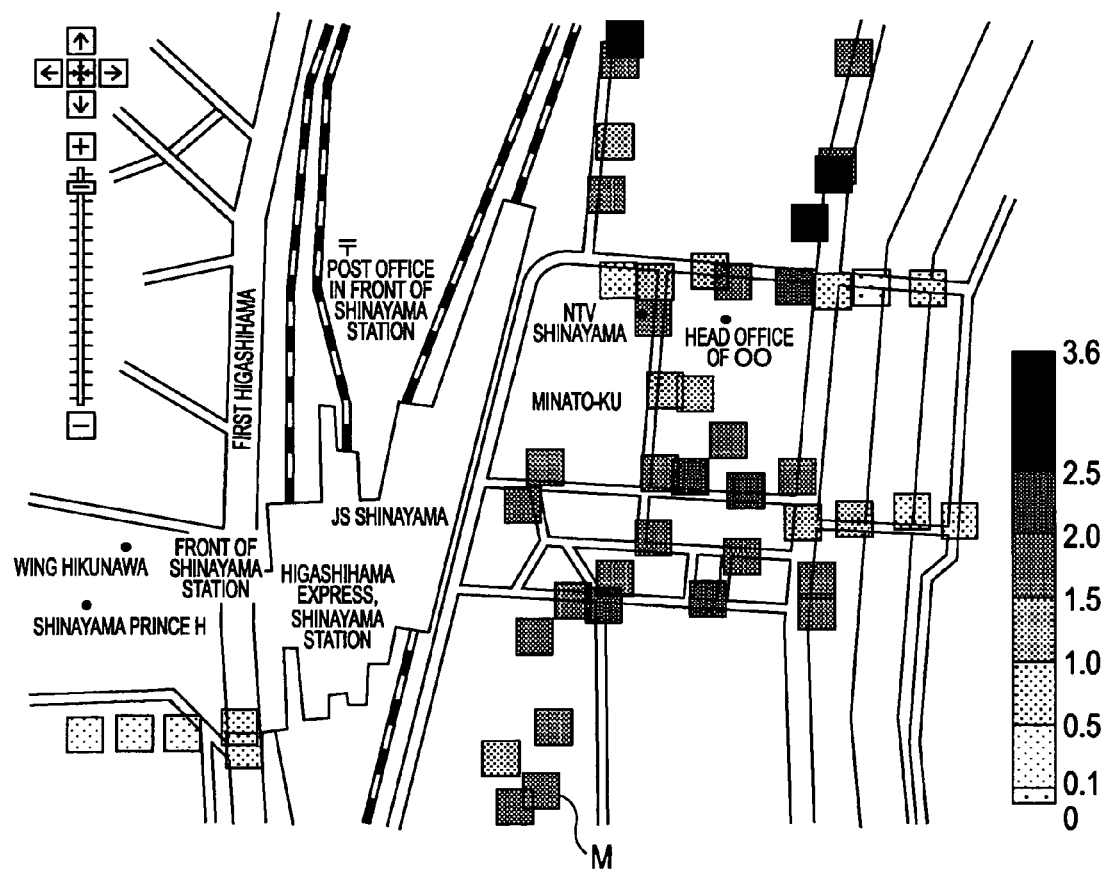
FIG. 7 is a diagram illustrating a display example of communication environment map information.

FIG. 7 is a diagram illustrating a display example of the communication environment map information. As shown in FIG. 7, the communication environment map information is information in which the speed information of the communication speed measured in the peripheral region of the predetermined position is plotted on the map information. In the example shown in FIG. 7, the speed information is plotted as different color markers M (different gray-scale markers M in FIG. 7) depending on the communication speed indicated by the speed information.

Here, when plural markers M are plotted on the map information, the visibility of the speed information may be reduced. Accordingly, the number of plotted markers M may be limited so as not to reduce the visibility of the speed information.

Figure 8A:
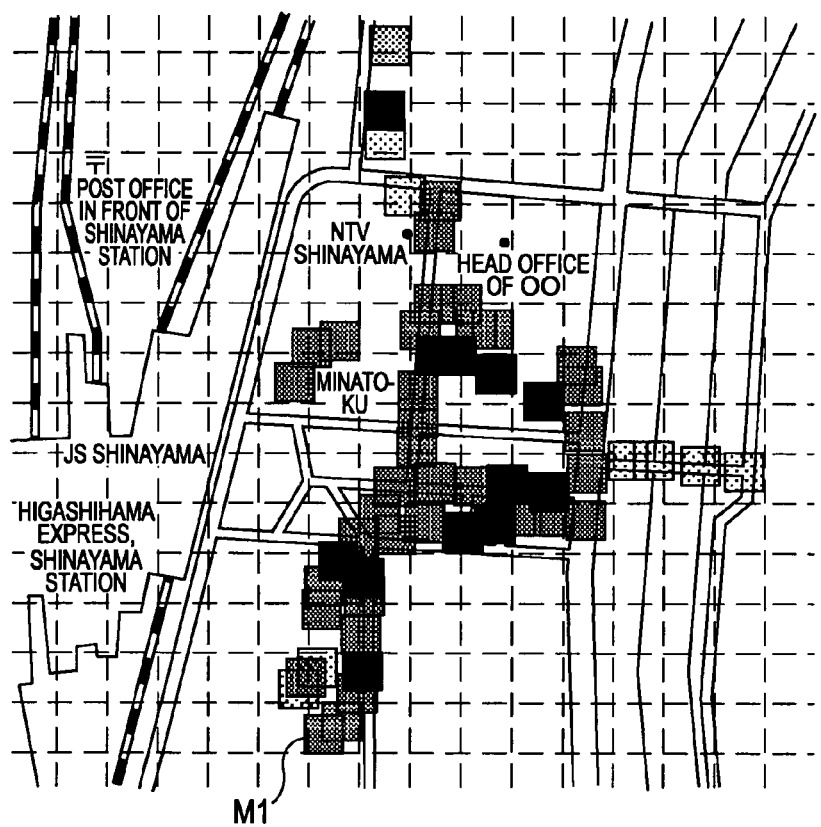
FIG. 8A is a diagram illustrating a flow of a plotting method when the number of plots is limited.

FIGS. 8A to 8D are diagrams illustrating the flow of the plotting method when the number of plots is limited. In the plotting method shown in FIGS. 8A to 8D, the peripheral region is divided into plural small regions as shown in FIG. 8A. The measurement information included in the communication environment information is divided into the measurement information corresponding to the small regions. Here, the latitudes and the longitudes for specifying the small regions and the position information included in the measurement information are used to divide the measurement information.

Figure 8B:
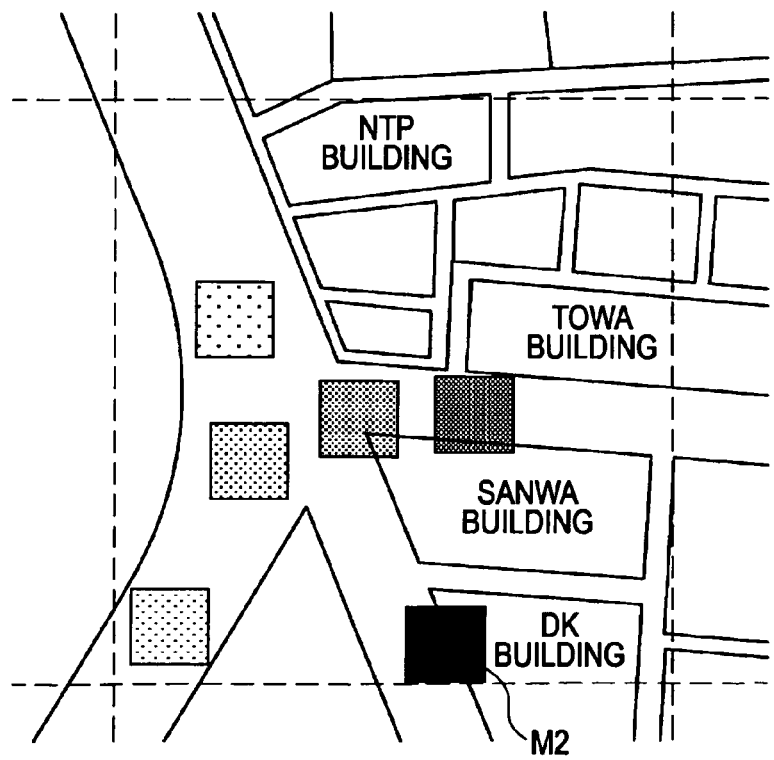
FIG. 8B is a diagram illustrating a flow of a plotting method when the number of plots is limited.
Figure 8C:
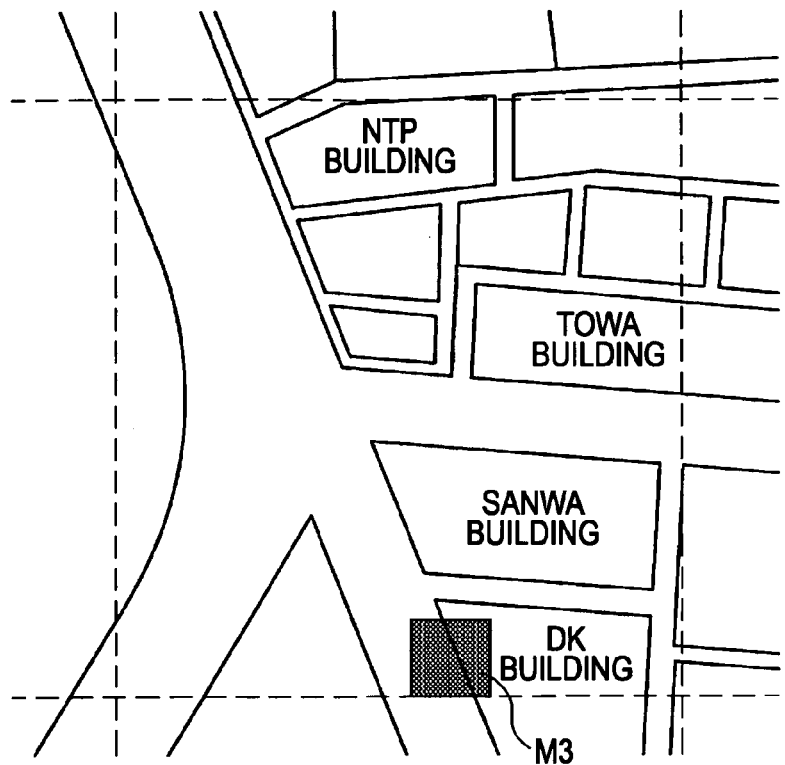
FIG. 8C is a diagram illustrating a flow of a plotting method when the number of plots is limited.
Figure 8D:
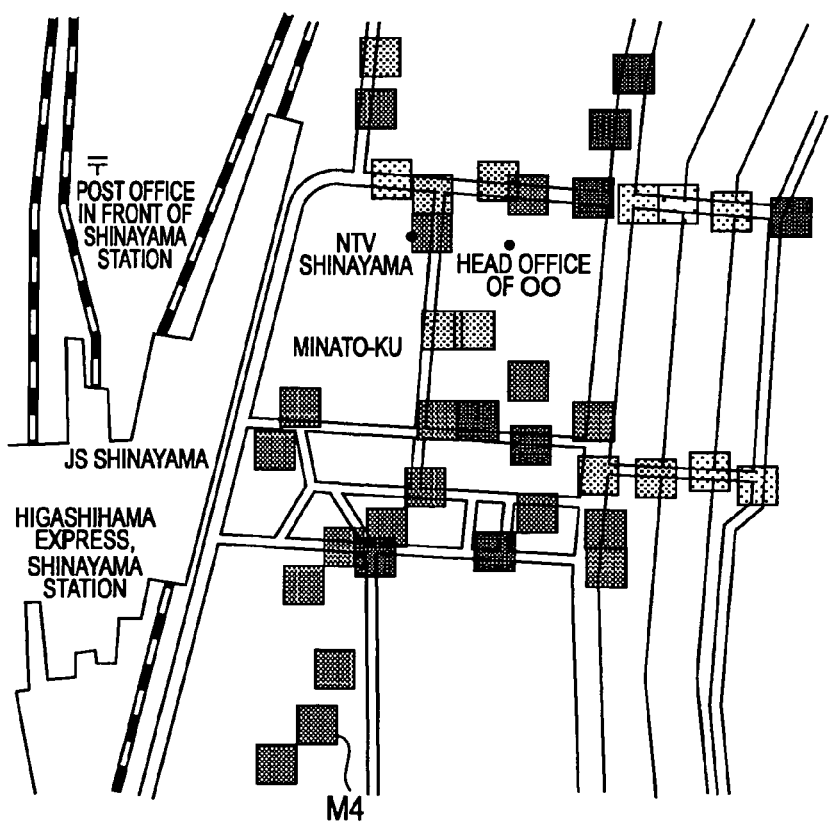
FIG. 8D is a diagram illustrating a flow of a plotting method when the number of plots is limited.

The maximum value and the average value of the communication speeds measured in the respective small regions are calculated from the speed information of one or more pieces of measurement information corresponding to the small regions. As shown in FIGS. 8B and 8C, the marker M2 at the position where the communication speed corresponding to the maximum value is measured is plotted as a marker M3 indicating the average value of the communication speed. Here, it is expected that the communication speed corresponding to the average value can be obtained at the position where the communication speed corresponding to the maximum value is measured. Accordingly, as shown in FIG. 8D, by limiting the number of plotted markers on the map information, it is possible to suppress the reduction in visibility of the speed information.

Figure 9A:
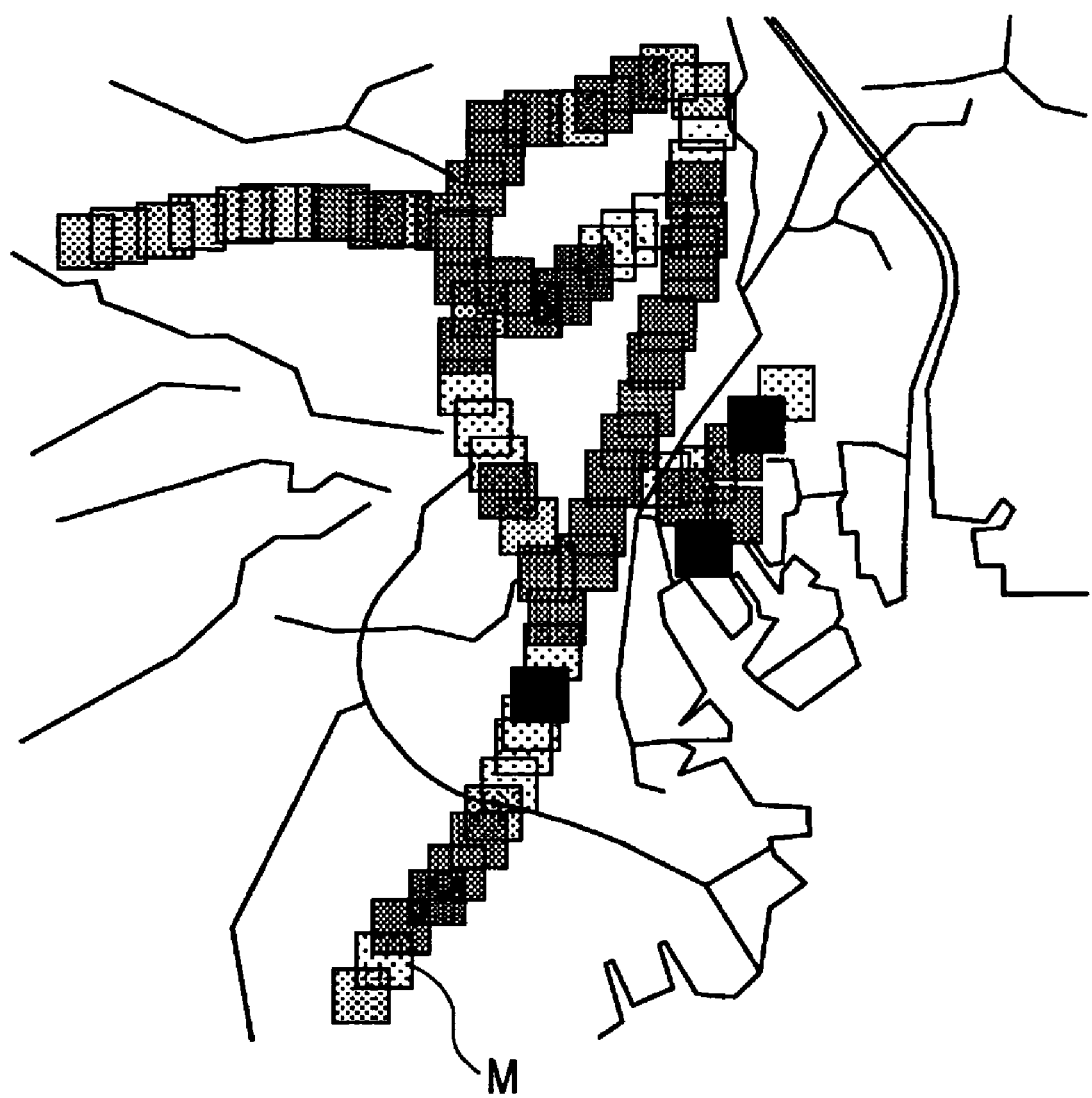
FIG. 9A is a diagram illustrating an example of a method of setting a small area.
Figure 9B:
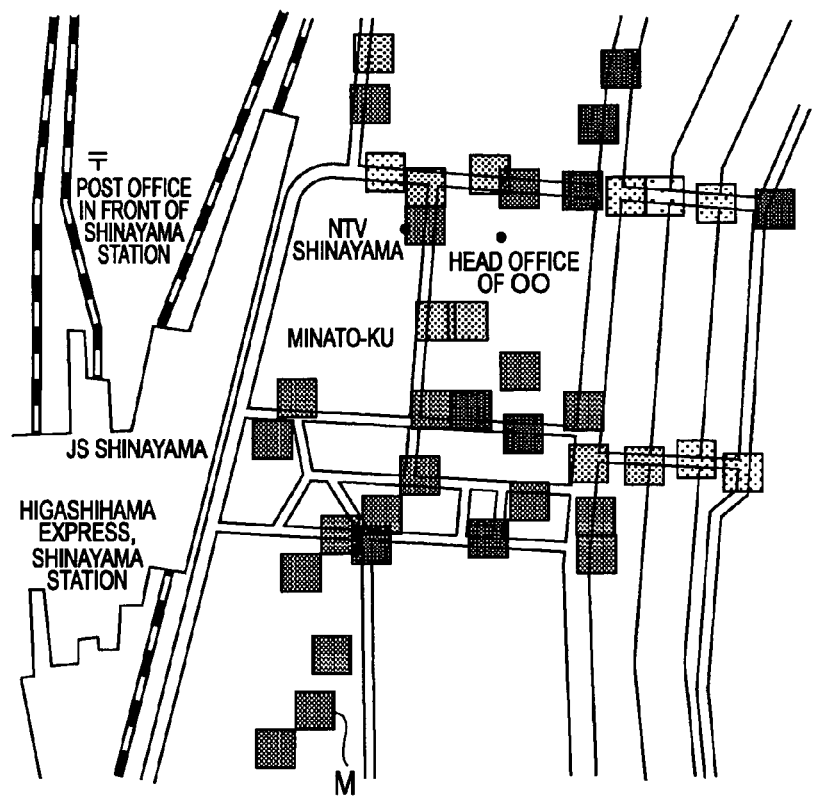
FIG. 9B is a diagram illustrating an example of a method of setting a small area.

FIGS. 9A and 9B are diagrams illustrating an example of the method of setting the small regions. As shown in FIGS. 9A and 9B, the smaller regions are set, for example, 10 m-square regions or 1 km-square regions depending on the reduction scale of the communication environment map information displayed in the mobile terminal 200 and the markers M corresponding to the small regions are plotted. The small regions may be set as regions obtained by dividing the peripheral region into a predetermined number of small regions such as 20×20 small regions. The small regions may be set as regions for limiting the number of markers M displayed on the map information to a predetermined number such as 100 markers.

2-3-3. Search for Measurement Information

The user can search for a good communication environment using the communication environment information and the communication environment map information. FIGS. 10A to 10D are diagrams illustrating an example of the search result of the measurement information. As shown in FIGS. 10A to 10D, a search menu SM for searching the measurement information is displayed in the mobile terminal 200 along with the communication environment map information.

The search menu SM includes a search condition specifying frame for specifying a search condition of the measurement information, a sorting condition specifying frame for specifying a sorting condition of the search result, and a search result displaying frame for displaying the search result.

Figure 10A:
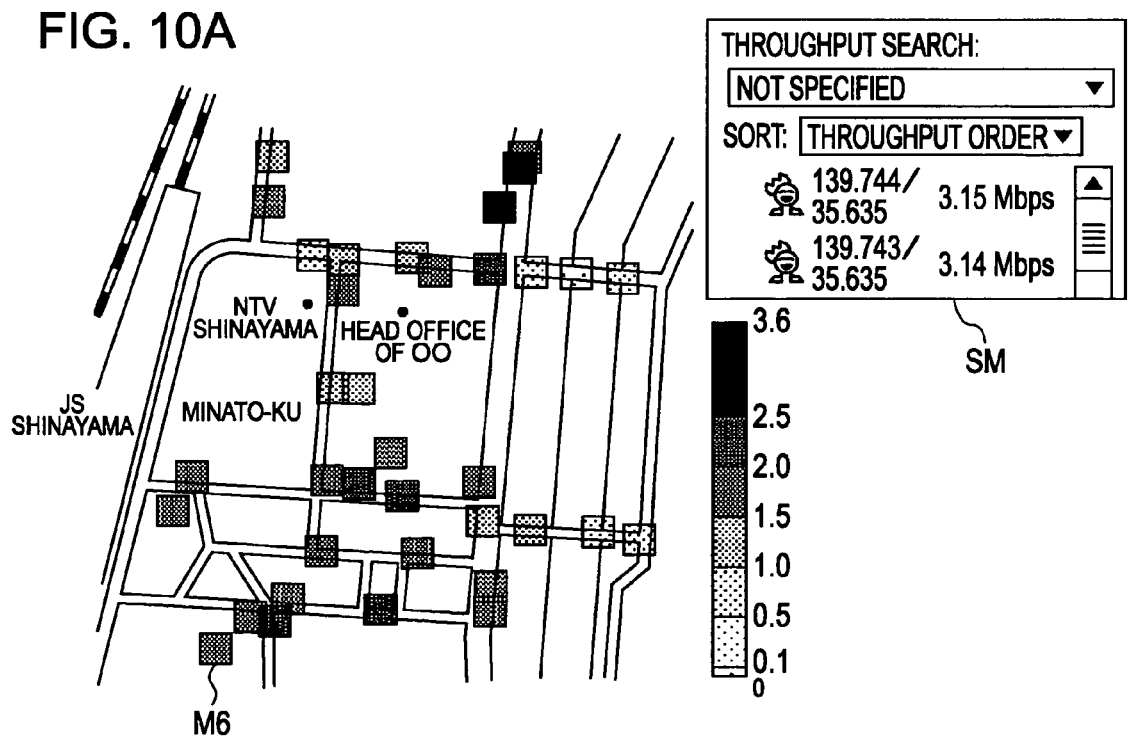
FIG. 10A is a diagram illustrating an example of the search result for measurement information.

As shown in FIG. 10A, when no search condition is specified, markers M6 indicating all the speed information (the speed information corresponding to the small regions when the number of plots is limited) included in the communication environment information are displayed. All the speed information included in the communication environment information is displayed in the search result displaying frame along with the corresponding position information (the latitude and longitude).

Figure 10B:
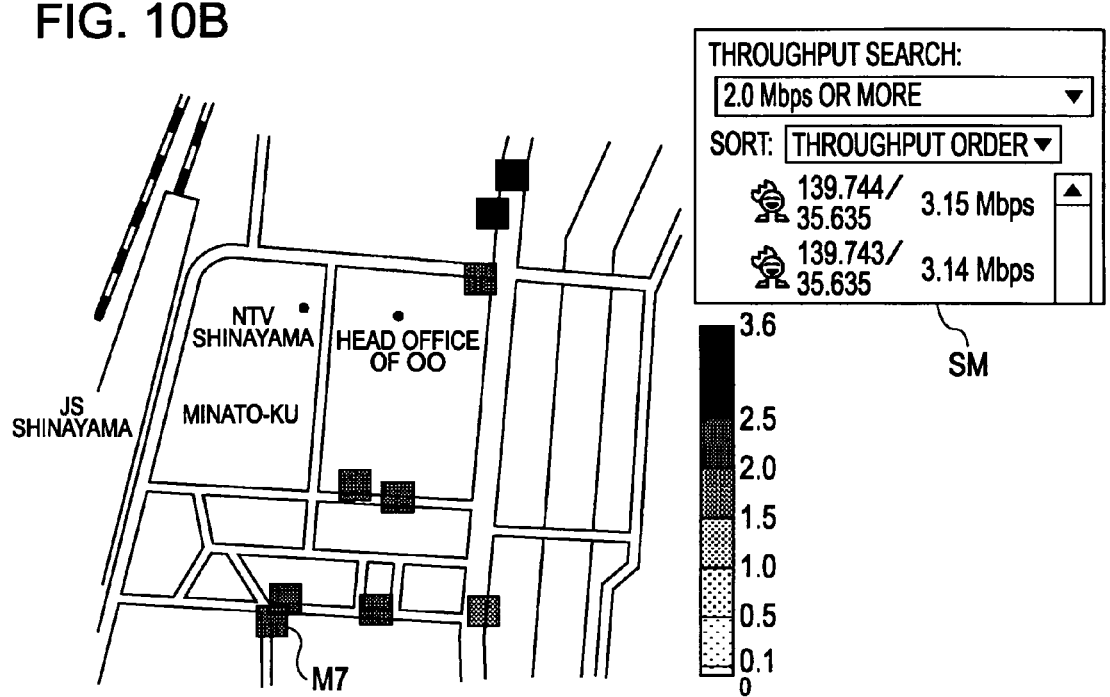
FIG. 10B is a diagram illustrating an example of the search result for measurement information.

As shown in FIG. 10B, when a search condition is specified, markers M7 indicating the speed information satisfying the search condition are displayed out of the speed information included in the communication environment information. In the example shown in FIG. 10B, since "2.0 Mbps or more" is specified as the search condition, only the markers M7 indicating the speed information of 2.0 Mbps or more are displayed. The speed information satisfying the search condition is displayed in the search result displaying frame along with the corresponding position information.

Figure 10C:
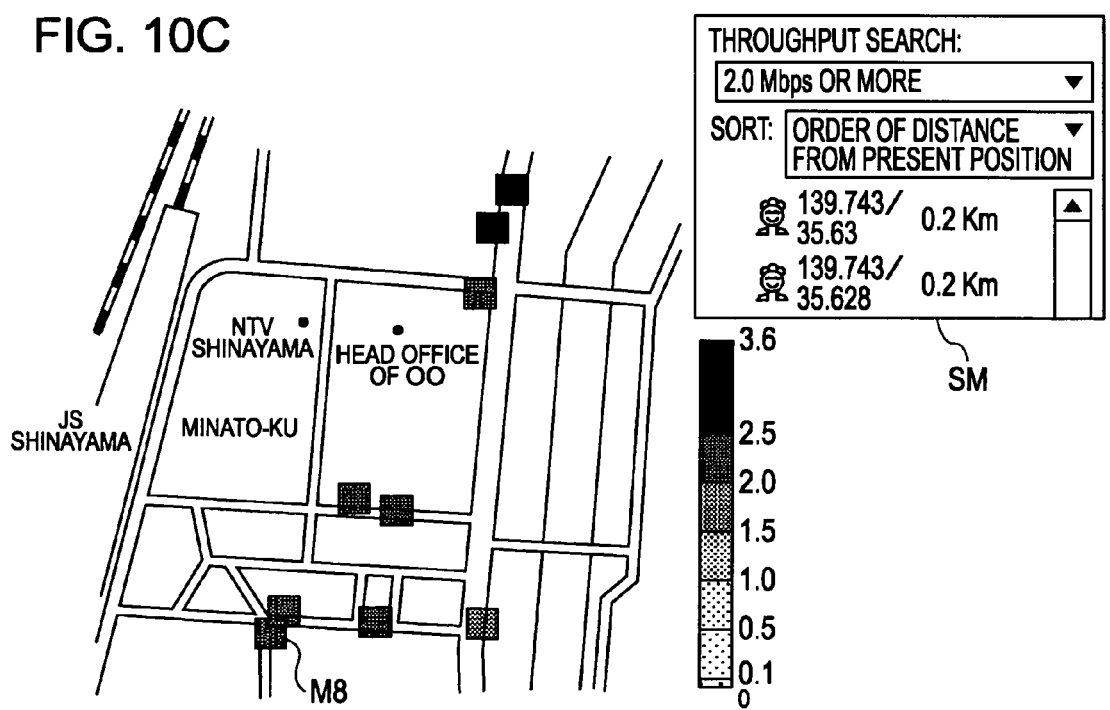
FIG. 10C is a diagram illustrating an example of the search result for measurement information.

As shown in FIG. 10C, when a sorting condition is specified, the speed information sorted on the basis of the sorting condition is displayed in a search result display range. In the example shown in FIG. 10C, "in the order of distances from the present position" is specified as the sorting condition. Accordingly, the position information corresponding to the speed information satisfying the search condition is sorted and displayed in the search result displaying frame in the order of distances from the present position along with the distance information from the present position of the mobile terminal 200. Markers M8 (=M7) indicating the speed information satisfying the search condition out of the speed information included in the communication environment information are also displayed. Here, the distance information is calculated from the position information indicating the present position of the mobile terminal 200 and the position information corresponding to the speed information using the map information.

Figure 10D:
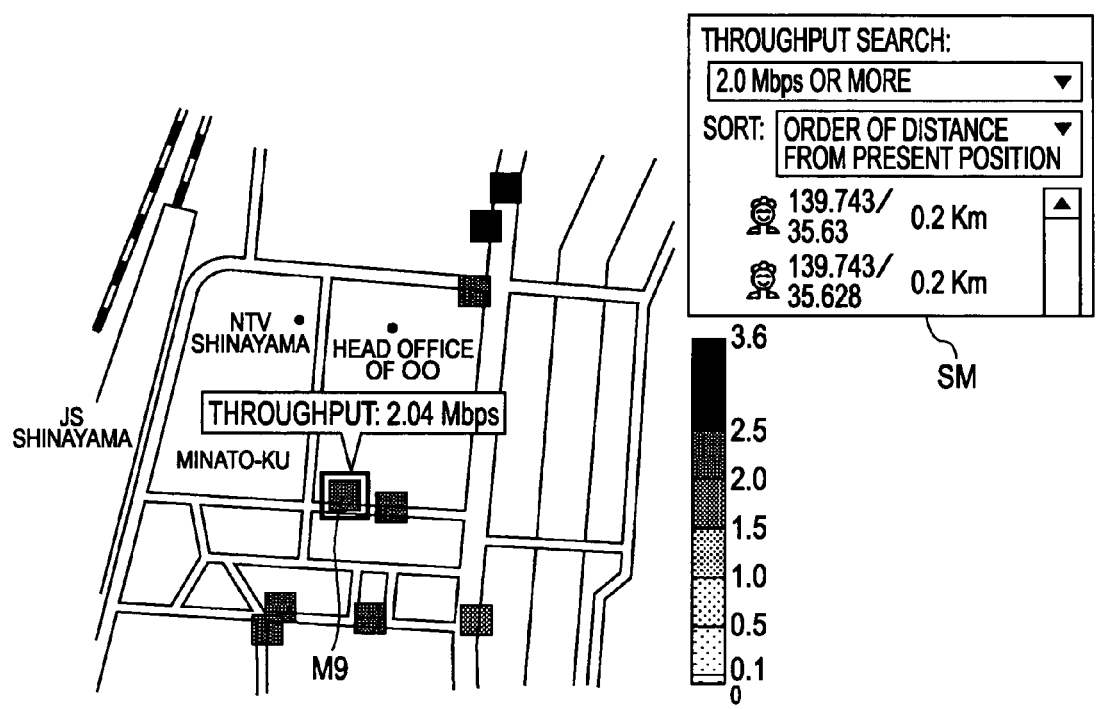
FIG. 10D is a diagram illustrating an example of the search result for measurement information.

As shown in FIG. 10D, a message (for example, "communication speed: 2.04 Mbps") for specifying the marker M9 indicating the speed information at the position apart by the shortest distance from the present position is displayed on the map information. The map relevant information (for example, peripheral parks, shops, establishments, and the like) in the vicinity of the spot specified by the marker M9 may be displayed along with the message specifying the marker.

At the time of searching the measurement information, the speed information may be corrected using a weighting coefficient set by the user. Here, the weighting coefficient is set in advance by the user or the mobile terminal 200 so that the speed information at the position where a communication environment welcoming to the user is corrected into a relatively large value. For example, it is assumed that speed information A indicating a communication speed of 1.5 Mbps is acquired on the road and speed information B indicating a communication speed of 1.0 Mbps is acquired in the park. The weighting coefficients at the positions of the road and the park are set to "1" and "2", respectively.

In this case, by acquiring the map relevant information indicating the acquiring position of the speed information on the basis of the position information included in the measurement information using the map information, it is determined that speed information A is acquired on the road and speed information B is acquired in the park. Then, speed information B is corrected into 2.0 Mbps (=1.0 Mbps×2) using the weighting coefficient of "2".

Accordingly, the user can search for a good communication environment on the basis of the communication speed corrected into a larger value as it comes closer to the position where the welcoming communication environment can be obtained, by confirming the communication environment information.

2-4. Conclusion

As described above, in the information providing method according to the first embodiment of the invention, the user of the mobile terminal 200 can search for a good communication environment on the basis of the actual communication speed which is measured by one or more mobile terminals 200 and varies depending on the communication conditions, by confirming the communication environment information.

Second Embodiment

A second embodiment of the invention will be described below. The same description as the first embodiment is not repeated.

3-1. Functional Configuration of Information Providing Server

Figure 11:
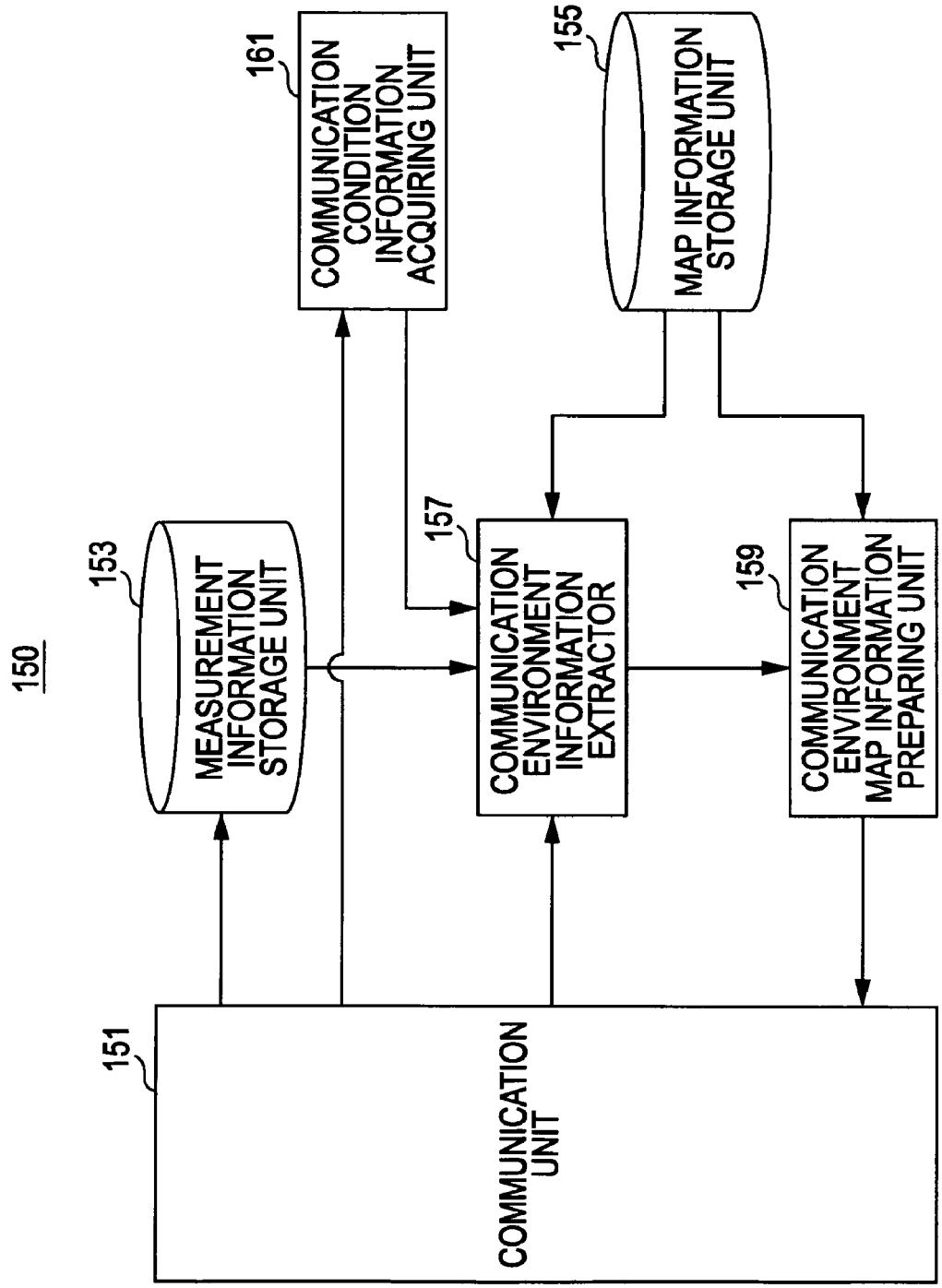
FIG. 11 is a block diagram illustrating the main functional configuration of an information providing server according to a second embodiment of the invention.

An information providing server 150 according to the second embodiment of the invention will be described with reference to FIG. 11. FIG. 11 is a block diagram illustrating the main functional configuration of the information providing server 150 according to the second embodiment.

As shown in FIG. 11, the information providing server 150 includes a communication unit 151, a measurement information storage unit 153, a map information storage unit 155, a communication environment information extractor 157, a communication environment map information preparing unit 159, and a communication operation condition information acquiring unit 161.

The communication unit 151 may receive communication condition specifying information for specifying a predetermined communication condition from a mobile terminal 250, in addition to the measurement information and the position specifying information.

The communication condition information acquiring unit 161 may acquire communication condition information representing a communication condition affecting the speed of a communication performed between the mobile terminal 250 and the base station 7, such as weather information, from an external system.

The measurement information storage unit 153 stores the measurement information received from one or more mobile terminals 250. The measurement information may include the communication condition information acquired by the mobile terminal 250 or may include the communication condition information acquired by the communication condition information acquiring unit 161.

The communication environment information extractor 157 extracts the communication environment information on the basis of the position specifying information received from the mobile terminal 250 or the communication condition specifying information to be described later. The communication environment information extractor 157 extracts, as the communication environment information, one or more pieces of measurement information corresponding to the communication condition specifying information out of one or more pieces of measurement information including the speed information of the communication speeds measured in the vicinity of a predetermined position specified by the position specifying information.

3-2. Functional Configuration of Mobile Terminal

Figure 12:
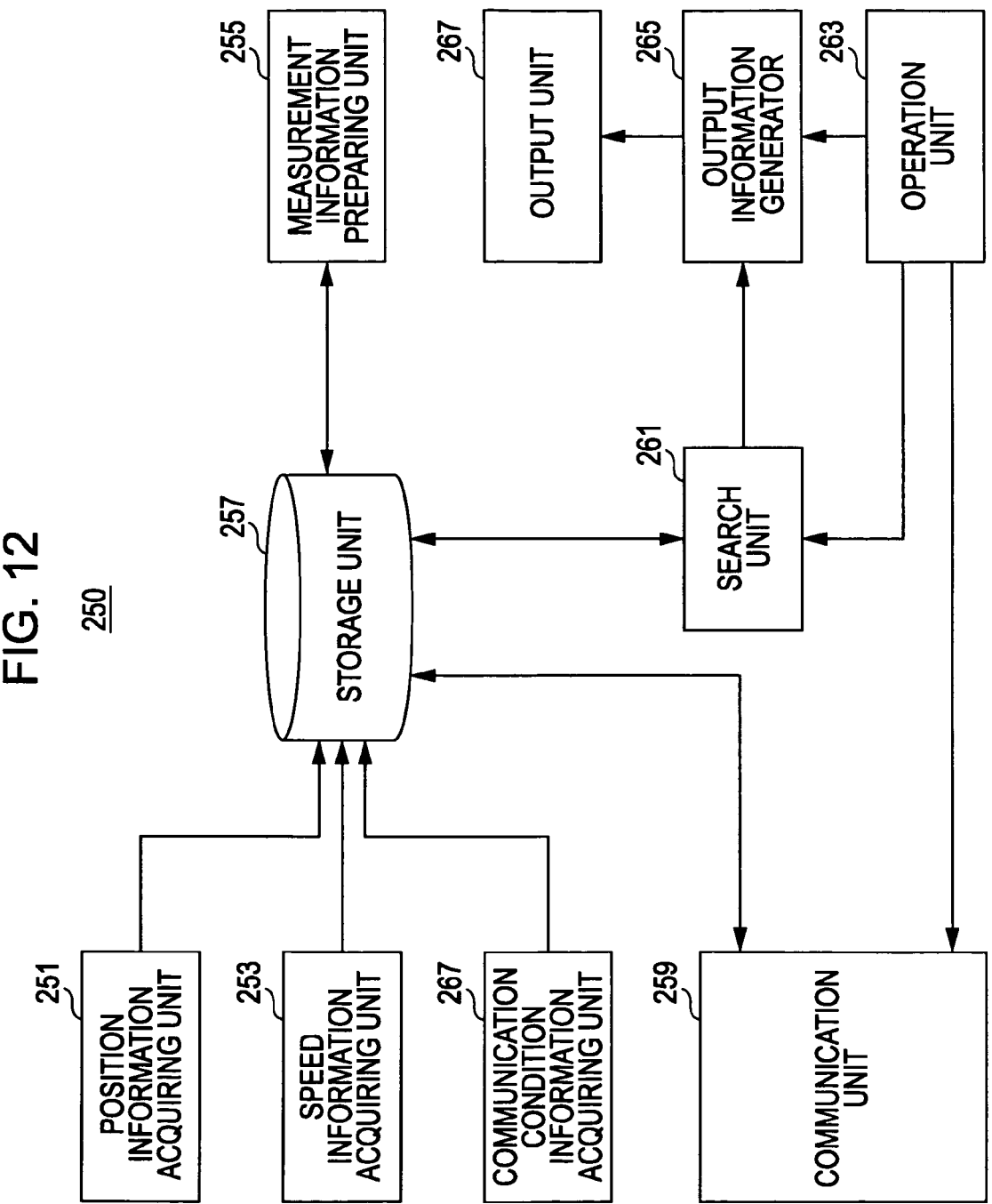
FIG. 12 is a block diagram illustrating the main functional configuration of a mobile terminal according to the second embodiment of the invention.

The mobile terminal 250 according to the second embodiment of the invention will be described below with reference to FIG. 12. FIG. 12 is a block diagram illustrating the main functional configuration of the mobile terminal 250 according to the second embodiment.

As shown in FIG. 12, the mobile terminal 250 includes a position information acquiring unit 251, a speed information acquiring unit 253, a measurement information preparing unit 255, a storage unit 257, a communication unit 259, a search unit 261, an operation unit 263, an output information generator 265, an output unit 267, and a communication condition information acquiring unit 269.

The communication condition information acquiring unit 269 acquires the communication condition information representing the communication conditions affecting the speed of the communication performed between the base station 7 and the mobile terminal, such as a communication condition of the base station, an external communication condition, and a communication condition of the terminal.

The communication condition information acquiring unit 269 acquires mobile terminal access information indicating the number of terminals accessing the base station 7, as the communication condition information indicating the communication condition of the base station, from the base station 7.

The communication condition information acquiring unit 269 acquires time zone and day information indicating the time zone and the day of the communication and weather information indicating the weather at the time of communication as the communication condition information indicating the external communication condition. The communication condition information acquiring unit 269 acquires the time zone and day information by the user's operation or using a clock and calendar function of the mobile terminal 250. The communication condition information acquiring unit 269 acquires the weather information by the user's operation or from an external information providing system providing the weather information.

The communication condition information acquiring unit 269 acquires, for example, moving speed information indicating the moving speed of the mobile terminal 250, communication characteristic information indicating a communication characteristic of the mobile terminal 250, communication scheme information indicating a communication scheme in use, as the communication condition information indicating the communication condition of the mobile terminal 250. The communication condition information acquiring unit 269 acquires the moving speed information (speed relative to the earth) from the positioning data, acquires the communication characteristic information from device information stored in the storage unit 257 or the like, and acquires the communication scheme information as the communication scheme set by the mobile terminal 250.

The measurement information preparing unit 255 prepares the measurement information including the position information, the speed information, and the communication condition information at a given point of time and stores the prepared measurement information in the storage unit 257.

The storage unit 257 stores the measurement information including the position information, the speed information, and the communication condition information, the communication environment information, the communication environment map information, image data of the search menu, and the movement history information.

The communication unit 259 transmits the measurement information including the communication condition information and the position specifying information to the information providing server 150 and receives the communication environment information and the communication environment map information from the information providing server 150. The communication unit 259 may receive the communication condition specifying information specifying a predetermined communication condition from the mobile terminal 250.

3-3. Information Providing Method

Figure 13:
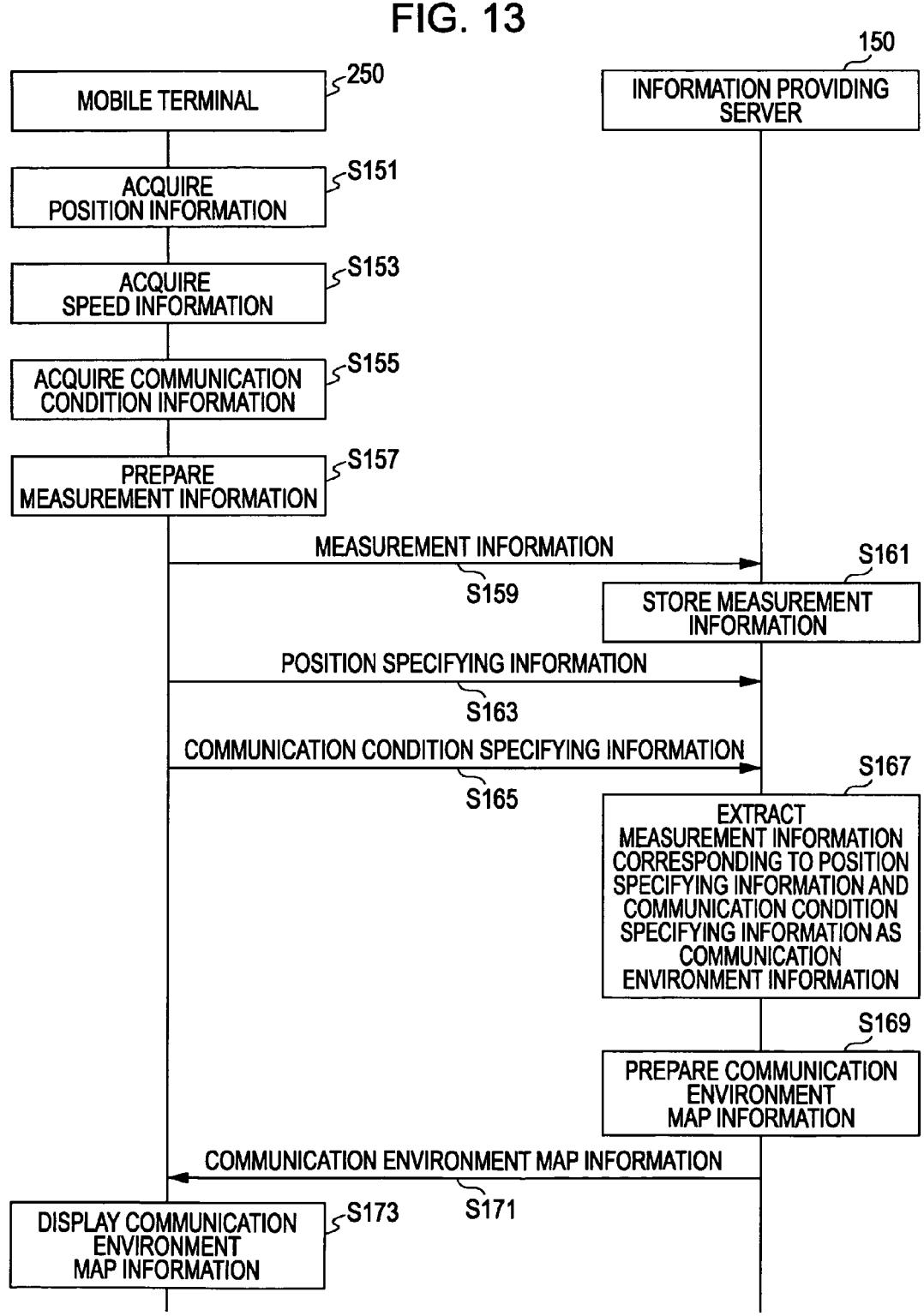
FIG. 13 is a sequence diagram illustrating a flow of an information providing method according to the second embodiment of the invention.

An information providing method according to the second embodiment of the invention will be described below with reference to FIG. 13. FIG. 13 is a diagram illustrating the flow of the information providing method according to the second embodiment.

The flow of the information providing method according to the second embodiment includes processes of steps S151 to S173. The processes other than steps S155, S165, and S167 are the same as the corresponding processes included in the information providing method according to the first embodiment shown in FIG. 4. Accordingly, the processes of steps S155, S165, and S167 will be described and a process of preparing the measurement information and a process of extracting the communication environment information will be described in detail.

In the process of step S155, the communication condition information acquiring unit 269 of the mobile terminal 250 acquires the communication condition information indicating the communication conditions affecting the speed of the communication with the base station 7. The measurement information preparing unit 255 prepares the measurement information including the position information, the speed information, the communication condition information at a given point of time (S157). The communication unit 259 transmits the measurement information to the information providing server 150 (S159).

In the process of step S165, the communication unit 259 transmits the communication condition specifying information specifying a predetermined communication condition to the information providing server 150. In the process of step S167, the communication environment information extractor 157 extracts the communication environment information on the basis of the position specifying information and the communication condition specifying information received from the mobile terminal 250. The communication condition information preparing unit 159 prepares the communication environment map information in which the speed information included in the measurement information corresponding to the communication condition specifying information out of the speed information of the communication speeds measured in the vicinity of a predetermined position is plotted on the map information on the basis of the communication environment information (S169).

Similarly to the first embodiment, the information providing server 150 may transmit the communication environment information to the mobile terminal 250 along with the communication environment map information, or may transmit the communication environment information to the mobile terminal 250 instead of the communication environment map information.

3-3-1. Communication Condition of Base Station

The speed of a communication between the mobile terminal 250 and the base station 7 varies depending on the communication condition of the base station (base station condition) such as the number of terminals accessing the base station 7. Accordingly, by providing the communication environment information corresponding to the base station condition, it is possible to improve the accuracy of the communication environment information.

The communication condition information acquiring unit 269 acquires as the communication condition information terminal access information from the base station 7 in the period when the communication with the base station 7 is performed. The communication condition information acquiring unit 269 may acquire the terminal access information at a predetermined point of time such as a communication start time and a communication end time in the period when the communication with the base station 7 is performed, or may periodically acquire the terminal access information, for example, every several seconds. The measurement information preparing unit 255 prepares the measurement information including the position information, the speed information, and the communication condition specifying information (terminal access information) at a given point of time and stores the prepared measurement information in the storage unit 257. The communication unit 259 transmits the measurement information to the information providing server 150. The communication unit 151 receives the measurement information from the mobile terminal 250 and the measurement information storage unit 153 stores the measurement information.

The communication unit 259 transmits the communication condition specifying information specifying a predetermined base station condition and a selection flag for selecting the base station condition as a predetermined communication condition to the information providing server 150 along with the position specifying information. Here, the base station condition may be automatically set as the terminal access information acquired at the time of the latest communication with the base station 7.

The communication environment information extractor 157 extracts the communication environment information on the basis of the position specifying information and the communication condition specifying information received from the mobile terminal 250. The communication environment information extractor 157 extracts one or more pieces of measurement information including the speed information of the communication speeds measured in the vicinity of a predetermined position specified by the position specifying information. The communication environment information extractor 157 extracts as the communication environment information the measurement information, which includes as the communication condition information the base station condition close to the base station condition indicated by the communication condition specifying information, out of the extracted measurement information. The communication environment map information preparing unit 159 prepares the communication environment map information on the basis of the communication environment information extracted on the basis of the communication condition specifying information, and the communication unit 151 transmits the communication environment map information to the mobile terminal 250.

Accordingly, the user can search for a good communication environment on the basis of the actual communication speed corresponding to the communication condition (terminal access information) of the base station, by confirming the communication environment information and/or the communication environment map information. In addition, the user may specify a base station condition (terminal access information) such as "number of accessing terminals of 100 or less", as the search condition of the measurement information, in the search menu. For example, when the information providing server 150 can hardly update the measurement information, the predetermined communication condition may not be specified by the mobile terminal 250 but by the information providing server 150.

3-3-2. External Communication Condition

The speed of the communication between the mobile terminal 250 and the base station 7 varies depending on the external communication condition (external conditions) such as the time zone and day of the communication and the weather at the time of the communication. Accordingly, by providing the communication environment information corresponding to the external condition, it is possible to improve the accuracy of the communication environment information.

The measurement information preparing unit 255 prepares the measurement information including the position information, the speed information, and the communication condition specifying information (such as the time zone and day and the weather information) at a given point of time and the measurement information storage unit 153 stores the prepared measurement information.

When acquiring the communication environment information corresponding to the time zone and day and the weather, the communication unit 259 transmits the communication condition specifying information specifying a predetermined external condition and the selection flag selecting the time zone and day and the weather information as the predetermined communication condition to the information providing server 150 along with the position specifying information. The communication condition specifying information specified as the external condition may not be specified by the mobile terminal 250, but may be automatically specified by the information providing server 150 using the clock and calendar function of the information providing server 150. The communication environment information extractor 157 extracts the communication environment information on the basis of the position specifying information and the communication condition specifying information. Here, the communication environment information extractor 157 extracts as the communication environment information the measurement information including as the communication condition information the external condition information corresponding to the external condition indicated by the communication condition specifying information.

Accordingly, the user can search for a good communication environment on the basis of the actual communication speed corresponding to the external condition by confirming the communication environment information. In addition, the user may specify any external condition such as "Monday", "10:00 to 12:00", and "fair" as the search condition of the measurement information in the search menu. The communication condition specifying information specified as the external condition may not be specified by the mobile terminal 250, but may be specified by the information providing server 150, for example, when the information providing server 150 can hardly update the measurement information.

The information providing server 150 may receive the measurement information including the position information and the speed information and may store the received measurement information in correlation with the time zone and day at the time of receiving the measurement information or the weather information acquired by the communication condition information acquiring unit 161.

3-3-3. Communication Condition of Terminal

The communication speed between the mobile terminal 250 and the base station 7 varies depending on the communication condition (terminal condition) of the mobile terminal 250 such as a moving speed of the mobile terminal 250, a communication characteristic (such as antenna characteristic) of the mobile terminal 250, and a communication scheme in use. Accordingly, by providing the communication environment information corresponding to the terminal condition, it is possible to improve the accuracy of the communication environment information.

The measurement information preparing unit 255 prepares the measurement information including the position information, the speed information, and the communication condition specifying information (such as the moving speed, the communication characteristic, and the communication scheme) at a given point of time and the measurement information storage unit 153 stores the measurement information.

The communication unit 259 transmits the communication condition specifying information specifying a predetermined terminal condition and the selection flag selecting the terminal condition as a predetermined communication condition to the information providing server 150 along with the position specifying information. The communication environment information extractor 157 extracts the communication environment information on the basis of the position specifying information and the communication condition specifying information. Here, the communication environment information extractor 157 extracts as the communication environment information the measurement information including as the communication condition information the terminal condition information corresponding to the terminal condition indicated by the communication condition specifying information.

Accordingly, the user can search for a good communication environment on the basis of the actual communication speed corresponding to the terminal condition (such as the moving speed, the communication characteristic, and the communication scheme) by confirming the communication environment information. In addition, the user may specify any terminal condition such as "moving speed of 0 to 5 km/h", "in use of OO antenna", and "in use of WLAN" as the search condition of the measurement information in the search menu.

When acquiring the communication environment information corresponding to two or more communication schemes and receiving the position specifying information from the mobile terminal 250, the information providing server 150 may analyze the communication scheme which can provide the maximum communication speed at a predetermined position specified by the position specifying information and may notify the communication scheme to the mobile terminal 250 having transmitted the position specifying information. In this case, the mobile terminal 250 may change the communication scheme so as to perform a communication using the notified communication scheme.

It has been described that the mobile terminal 250 receives one or more pieces of measurement information extracted on the basis of the position specifying information and the predetermined communication condition. However, the mobile terminal 250 may receive one or more pieces of measurement information extracted on the basis of the position specifying information and may select and output the measurement information corresponding to a predetermined communication condition as the communication environment information.

3-4. Conclusion

As described above, in the information providing method according to the second embodiment of the invention, the user of the mobile terminal 250 can search for a good communication environment on the basis of the communication speed corresponding to a predetermined communication condition out of the actual communication speeds which is measured by one or more mobile terminals 250 and varies depending on the communication conditions, by confirming the communication environment information.

4. Hardware Configuration

Figure 14:
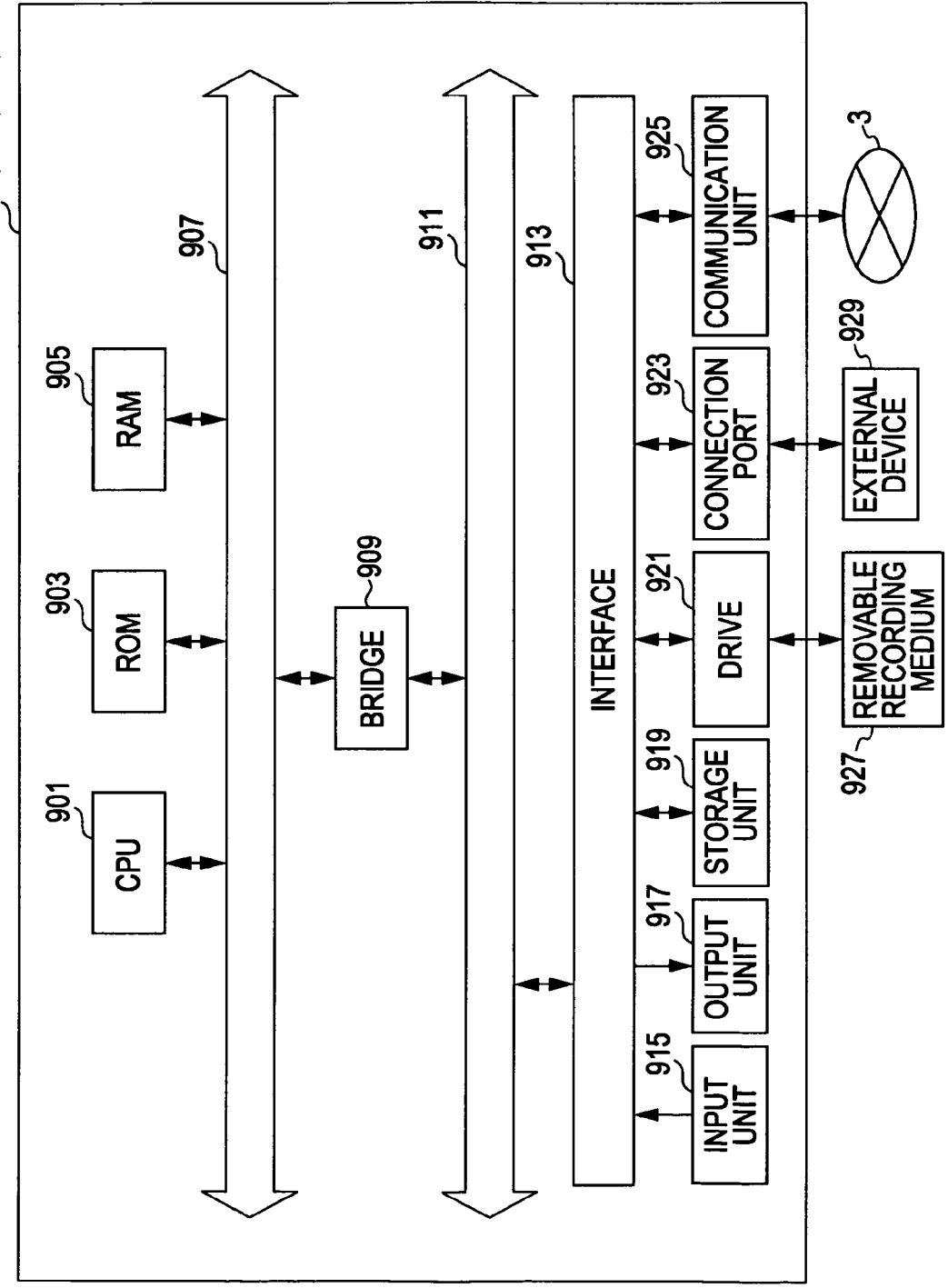
FIG. 14 is a block diagram illustrating an example of the hardware configuration of the information providing server.

The hardware configuration of the information providing server 100 or 150 according to the embodiments of the invention will be described with reference to FIG. 14. FIG. 14 is a block diagram illustrating an example of the hardware configuration of the information providing server 100 or 150.

The information providing server 100 or 150 includes a CPU 901, a ROM 903, a RAM 905, a host bus 907, a bridge 909, an external bus 911, an interface 913, an input unit 915, an output unit 917, a storage unit 919, a drive 921, a connection port 923, and a communication unit 925.

The CPU 901 serves as a computation unit and a control unit and partially controls the operations of the information providing server 100 or 150 in accordance with various programs recorded in the ROM 903, the RAM 905, the storage unit 919, or a removable recording medium 927. The ROM 903 stores the programs or parameters used by the CPU 901. The RAM 905 temporarily stores the programs executed by the CPU 901 and the parameters for executing the programs. The CPU 901, the ROM 903, and the RAM 905 are connected to each other through the host bus 907. The host bus 907 is connected to the external bus 911 through the bridge 909.

The input unit 915 is operation means which can be operated by a user, such as a mouse, a keyboard, a touch panel, buttons, and switches. The input unit 915 may be remote operation means using RF waves such as infrared or may be an external device 929 such as a mobile phone or a PDA responding to the operation of the information providing server 100 or 150. The input unit 915 includes an input control circuit generating an input signal on the basis of the operation information input from the user with the operation means and outputting the generated input signal to the CPU 901. The user of the information providing server 100 or 150 inputs various data to the information providing server 100 or 150 by the operation of the input unit 915 and instructs processing operations.

The output unit 917 includes a device which can visually or auditorily notify a user of the acquired information, such as a display such as a CRT display, a liquid crystal display, and a lamp, an audio output unit such as a speaker and a headphone, a printer, a mobile phone, and a facsimile. The output unit 917 outputs the processing result of the information providing server 100 or 150. For example, the display displays the processing result of the information providing server 100 or 150 as text information or image information and the audio output unit converts the audio signals such as the reproduced audio data or acoustic data into analog signals and outputs the analog signals.

The storage unit 919 is a data storing unit and examples thereof include a magnetic memory device such as an HDD, a semiconductor memory device, an optical memory device, and a magneto-optical memory device. The storage unit 919 stores the programs executed by the CPU 901, various data thereof, and various data acquired from the outside.

The drive 921 is a reader and writer for a recording medium and is built in or externally attached to the information providing server 100 or 150. The drive 921 reads the recorded data from the removable recording medium 927 such as a magnetic disk, an optical disk, a magneto-optical disk, or a semiconductor memory, outputs the read data to the RAM 905, and writes data to be written.

The connection port 923 is a port serving to connect the external device 929 directly to the information providing server 100 or 150, such as a USB port, an SCSI port, and an RS232C port. The information providing server 100 or 150 acquires and provides data from the external device 929 connected to the connection port 923 through the connection port 923.

The communication unit 925 is a communication interface 913 including a communication device accessing the communication network 3. Examples of the communication device 925 include a wired or wireless LAN, a WUSB communication card, an ADSL router, and a communication modem. The communication unit 925 transmits and receives signals to and from the Internet or other communication devices in accordance with a predetermined protocol. The communication network 3 accessed by the communication unit 925 includes networks connected in a wired or wireless manner. Examples thereof include the Internet, a home LAN, an infrared communication, a RF communication, or a satellite communication.

An example of the hardware configuration for realizing the functions of the information providing server 100 or 150 according to the embodiments of the invention has been described. The elements of the hardware may be constructed by general-purpose devices or may be constructed by devices specializing the functions of the elements. The hardware configuration of the mobile terminal 200 or 250 according to the embodiments of the invention is substantially the same as the hardware configuration of the information providing server 100 or 150 and thus the description thereof is not repeated.

While the preferred embodiments of the invention have been described with reference to the accompanying drawings, the invention is not limited to the embodiments. It will be understood by those skilled in the art that various modifications or corrections can be made without departing from the technical scope of the invention described in appended the claims and the modifications and corrections belong to the technical scope of the invention.

For example, although it has been described that the communication environment map information is prepared by the information providing server 100 or 150 on the basis of the communication environment information and the map information, the communication environment map information may be prepared by the mobile terminal 200 or 250. In this case, a communication environment map information preparing unit corresponding to the communication environment map information preparing unit 109 or 159 is disposed in the mobile terminal 200 or 250. The mobile terminal 200 or 250 prepares the communication environment map information on the basis of the communication environment information received from the information providing server 100 or 150 and the map information acquired from a map information storage unit disposed in the mobile terminal 200 or 250 or an external map information providing system.

It should be understood by those skilled in the art that various modifications, combinations, sub-combinations and alterations may occur depending on design requirements and other factors insofar as they are within the scope of the appended claims or the equivalents thereof.

What is claimed is:

1. An information providing device comprising:
    a measurement information receiver receiving, from one or more mobile communication devices, measurement information including position information representing a present position of one mobile communication device and speed information representing a speed of a communication performed between the mobile communication device and a wireless base station at a given point of time;
    a measurement information storage unit storing the measurement information received from the one or more mobile communication devices;
    a specifying information receiver receiving position specifying information for specifying a predetermined position from the mobile communication device;
    a communication environment information extractor extracting as communication environment information one or more pieces of the measurement information including the speed information of communication speeds measured in the vicinity of the predetermined position from the measurement information stored in the measurement information storage unit; and
    a communication environment information transmitter transmitting the communication environment information to the mobile communication device having transmitted the position specifying information.

2. The information providing device according to claim 1, further comprising a communication environment map information preparing unit preparing communication environment map information in which the speed information of the communication speeds measured in the vicinity of the predetermined position is plotted on map information on the basis of the communication environment information, wherein the communication environment information transmitter transmits the communication environment map information to the mobile communication device having transmitted the position specifying information.

3. The information providing device according to claim 2, wherein the speed information of the communication speeds measured in the vicinity of the predetermined position is plotted on the map information as different color or grayscale markers depending on the communication speed indicated by the speed information.

4. The information providing device according to claim 2, wherein the measurement information included in the communication environment information is divided among a plurality of corresponding regions based on the position information included in the measurement information.

5. The information providing device according to claim 4, wherein a maximum value and an average value of the communication speeds are calculated for each of the plurality of corresponding regions from the speed information of the measurement information corresponding to that region, and the maximum values and the average values for each of the plurality of corresponding regions is plotted on the map information.

6. The information providing device according to claim 1, wherein the measurement information receiver receives, from the one or more mobile communication devices, the measurement information including the position information, the speed information, and communication condition information representing a communication condition affecting the speed of the communication performed between the mobile communication device and the wireless base station at a given point of time, wherein the communication environment information extractor extracts, as the communication environment information, one or more pieces of the measurement information corresponding to a predetermined communication condition out of the one or more pieces of the measurement information, which includes the speed information of the communication speeds measured in the vicinity of the predetermined position, from the measurement information stored in the measurement information storage unit, and wherein the communication environment information transmitter transmits the communication environment information to the mobile communication device having transmitted the position specifying information.

7. The information providing device according to claim 6, further comprising a communication environment map information preparing unit preparing communication environment map information in which the speed information included in the one or more pieces of measurement information corresponding to the predetermined communication condition out of the speed information of the communication speeds measured in the vicinity of the predetermined position is plotted on map information on the basis of the communication environment information, wherein the communication environment information transmitter transmits the communication environment map information to the mobile communication device having transmitted the position specifying information.

8. A mobile communication device comprising:
a position information acquiring unit acquiring position information representing a present position of the mobile communication device;
a speed information acquiring unit measuring a speed of a communication performed between a wireless base station and the mobile communication device and acquiring the measured communication speed as speed information;
a measurement information transmitter transmitting measurement information including the position information and the speed information at a given point of time to an information providing device;
a specifying information transmitter transmitting position specifying information for specifying a predetermined position to the information providing device;
a communication environment information receiver receiving, as communication environment information from the information providing device, one or more pieces of the measurement information including the speed information on the communication speeds measured in the vicinity of the predetermined position out of the measurement information, which is transmitted from one or more mobile communication devices and stored in the information providing device; and
an output unit outputting the communication environment information.

9. The mobile communication device according to claim 8, wherein the communication environment information receiver receives communication environment map information in which the speed information of the communication speeds measured in the vicinity of the predetermined position is plotted on map information from the information providing device, and wherein the output unit outputs the communication environment map information.

10. The mobile communication device according to claim 8, further comprising a communication condition information acquiring unit acquiring communication condition information representing a communication condition affecting the speed of the communication performed between the wireless base station and the mobile communication device, wherein the measurement information transmitter transmits the measurement information including the position information, the speed information, and the communication condition information at a given point of time to the information providing device, wherein the communication environment information receiver receives, as the communication environment information from the information providing device, one or more pieces of the measurement information corresponding to the predetermined communication condition out of the one or more pieces of the measurement information including the speed information of the communication speeds measured in the vicinity of the predetermined position, and wherein the output unit outputs the communication environment information.

11. The mobile communication device according to claim 10, wherein the communication environment information receiver receives, from the information providing device, communication environment map information in which the speed information included in the one or more pieces of the measurement information corresponding to the predetermined communication condition out of the speed information of the communication speeds measured in the vicinity of the predetermined position is plotted on map information, and wherein the output unit outputs the communication environment map information.

12. The mobile communication device according to claim 8, further comprising a search unit searching the measurement information included in the communication environment information for the measurement information corresponding to a predetermined search condition, wherein the output unit outputs the speed information included in the searched measurement information.

13. The mobile communication device according to claim 9 or 12, further comprising a search unit searching the measurement information included in the communication environment map information for the measurement information corresponding to a predetermined search condition, wherein the output unit outputs the speed information included in the searched measurement information.

14. The mobile communication device according to claim 8, wherein the speed information of the communication speeds measured in the vicinity of the predetermined position are sorted based on a sorting condition, and the output unit outputs the sorting condition and the sorted speed information.

15. The mobile communication device according to claim 8, wherein the speed information of the communication speeds measured in the vicinity of the predetermined position are modified using one or more weighting coefficients associated with the position information included in the measurement information.

16. An information providing system comprising an information providing device and one or more mobile communication devices,
wherein the mobile communication device includes
a position information acquiring unit acquiring position information representing a present position of the mobile communication device,
a speed information acquiring unit measuring a speed of a communication performed between a wireless base station and the mobile communication device and acquiring the measured communication speed as speed information,
a measurement information transmitter transmitting measurement information including the position information and the speed information at a given point of time to the information providing device,
a specifying information transmitter transmitting position specifying information for specifying a predetermined position to the information providing device,
a communication environment information receiver receiving communication environment information representing a communication environment in the vicinity of the predetermined position from the information providing device, and
an output unit outputting the communication environment information, and
wherein the information providing device includes
a measurement information receiver receiving the measurement information from the one or more mobile communication devices,
a measurement information storage unit storing the measurement information received from the one or more mobile communication devices,
a specifying information receiver receiving position specifying information from the mobile communication device,
a communication environment information extractor extracting as communication environment information one or more pieces of the measurement information including the speed information of the communication speeds measured in the vicinity of the predetermined position from the measurement information stored in the measurement information storage unit, and
a communication environment information transmitter transmitting the communication environment information to the mobile communication device having transmitted the position specifying information.

17. An information providing method comprising the steps of:
receiving, from one or more mobile communication devices, measurement information including position information representing a present position of one mobile communication device and speed information representing a speed of a communication performed between the mobile communication device and a wireless base station at a given point of time;
storing the measurement information received from the one or more mobile communication devices;
receiving position specifying information for specifying a predetermined position from the mobile communication device;
extracting as communication environment information one or more pieces of the measurement information including the speed information of communication speeds measured in the vicinity of the predetermined position from the stored measurement information; and
transmitting the communication environment information to the mobile communication device having transmitted the position specifying information.

18. A processor encoded with a computer program to execute an information providing method, the method comprising:
receiving, from one or more mobile communication devices, measurement information including position information representing a present position of one mobile communication device and speed information representing a speed of a communication performed between the mobile communication device and a wireless base station at a given point of time;
storing the measurement information received from the one or more mobile communication devices;
receiving position specifying information for specifying a predetermined position from the mobile communication device;
extracting as communication environment information one or more pieces of the measurement information including the speed information of communication speeds measured in the vicinity of the predetermined position from the stored measurement information; and
transmitting the communication environment information to the mobile communication device having transmitted the position specifying information.

* * * * *